(12) United States Patent
Dong et al.

(10) Patent No.: US 11,391,916 B2
(45) Date of Patent: Jul. 19, 2022

(54) OPTICAL IMAGING LENS

(71) Applicant: Genius Electronic Optical (Xiamen) Co., Ltd., Fujian (CN)

(72) Inventors: Chuanbo Dong, Fujian (CN); Qingzhi Zhu, Fujian (CN); Xinming Liu, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 366 days.

(21) Appl. No.: 16/801,157

(22) Filed: Feb. 26, 2020

(65) Prior Publication Data
US 2021/0149160 A1 May 20, 2021

(30) Foreign Application Priority Data
Nov. 14, 2019 (CN) .......................... 201911112019.4

(51) Int. Cl.
*G02B 9/64* (2006.01)
*G02B 13/00* (2006.01)
(52) U.S. Cl.
CPC ........... *G02B 9/64* (2013.01); *G02B 13/0045* (2013.01)
(58) Field of Classification Search
USPC ....................................................... 359/755
See application file for complete search history.

(56) References Cited

U.S. PATENT DOCUMENTS

| 4,913,540 | A | * | 4/1990 | Minefuji | ................ | G02B 13/22 359/755 |
| 2014/0139931 | A1 | * | 5/2014 | Kubota | .................... | G02B 9/62 359/740 |
| 2015/0212298 | A1 | * | 7/2015 | Shinohara | .......... | G02B 13/0045 359/708 |
| 2016/0124191 | A1 | * | 5/2016 | Hashimoto | .............. | G02B 9/64 359/708 |
| 2021/0041674 | A1 | * | 2/2021 | Kuo | .................... | G02B 27/0025 |

* cited by examiner

*Primary Examiner* — Darryl J Collins
(74) *Attorney, Agent, or Firm* — Winston Hsu

(57) ABSTRACT

An optical imaging lens includes a first lens element to a seventh lens element from an object side to an image side in order along an optical axis, and each lens element has an object-side surface and an image-side surface. A periphery region of the image-side surface of the first lens element is concave, a periphery region of the object-side surface of the third lens element is concave, a periphery region of the object-side surface of the fourth lens element is concave, the fifth lens has negative refractive power, a periphery region of the object-side surface of the fifth lens element is concave, and an optical axis region of the image-side surface of the sixth lens element is concave. The optical imaging lens has only the above seven lens elements with refractive power, and the optical imaging lens satisfies the following conditions: (G45+T5+G56+T6+G67+T7)/(T1+G12+T2) ≥3.200.

20 Claims, 37 Drawing Sheets

Longitudinal spherical aberration

Sagittal field curvature

Tangential field curvature

Distortion

| First Example | | | | | | | |
|---|---|---|---|---|---|---|---|
| EFL=4.715mm; HFOV=41.682degrees; TTL=5.505mm; Fno=1.550; ImgH=4.500mm | | | | | | | |
| No. | | Curvature Radius (mm) | Ape. Stop Lens Thickness Air Gap (mm) | | Material | Refractive Index | Abbe No. | Focal Length (mm) |
| | Object | Infinity | Infinity | | | | |
| 80 | Ape. Stop | Infinity | -0.652 | | | | |
| 11 | First Lens | 2.121 | 0.661 | T1 | Plastic | 1.545 | 55.987 | 5.197 |
| 12 | | 7.469 | 0.012 | G12 | | | |
| 21 | Second Lens | 3.471 | 0.229 | T2 | Plastic | 1.661 | 20.412 | -29.713 |
| 22 | | 2.876 | 0.440 | G23 | | | |
| 31 | Third Lens | 33.554 | 0.396 | T3 | Plastic | 1.545 | 55.987 | 9.722 |
| 32 | | -6.283 | 0.040 | G34 | | | |
| 41 | Fourth Lens | 19.605 | 0.217 | T4 | Plastic | 1.661 | 20.412 | -67.956 |
| 42 | | 13.626 | 0.715 | G45 | | | |
| 51 | Fifth Lens | -2.363 | 0.266 | T5 | Plastic | 1.661 | 20.412 | -6.570 |
| 52 | | -5.358 | 0.012 | G56 | | | |
| 61 | Sixth Lens | 2.120 | 0.727 | T6 | Plastic | 1.545 | 55.987 | 5.962 |
| 62 | | 5.337 | 0.545 | G67 | | | |
| 71 | Seventh Lens | -20.842 | 0.705 | T7 | Plastic | 1.545 | 55.987 | -4.243 |
| 72 | | 2.639 | 0.200 | G7F | | | |
| 90 | Filter | Infinity | 0.101 | | | 1.560 | 51.300 |
| | | Infinity | 0.241 | | | | |
| 91 | Image Plane | Infinity | | | | | |

FIG. 28

| No. | K | $a_2$ | $a_4$ | $a_6$ | $a_8$ | $a_{10}$ |
|---|---|---|---|---|---|---|
| 11 | 3.868505E-01 | 0.000000E+00 | -8.040350E-03 | 8.284805E-03 | -1.371269E-02 | 1.066133E-02 |
| 12 | 1.801965E+01 | 0.000000E+00 | -1.068648E-02 | -6.239028E-02 | 1.120694E-01 | -9.578156E-02 |
| 21 | 3.559343E+00 | 0.000000E+00 | -2.617796E-02 | -9.803194E-02 | 1.358695E-01 | -1.030230E-01 |
| 22 | 9.683219E-01 | 0.000000E+00 | -9.775222E-03 | -3.918439E-02 | 1.414919E-02 | 1.942399E-02 |
| 31 | 0.000000E+00 | 0.000000E+00 | 6.028863E-03 | 1.521592E-03 | -3.800072E-02 | 4.440852E-02 |
| 32 | -1.785746E+01 | 0.000000E+00 | 9.466728E-02 | -2.736523E-01 | 2.946339E-01 | -2.014620E-01 |
| 41 | 9.900379E+01 | 0.000000E+00 | 9.394647E-02 | -2.465801E-01 | 2.019514E-01 | -9.231841E-02 |
| 42 | 0.000000E+00 | 0.000000E+00 | 1.571995E-02 | -3.282760E-02 | -1.449442E-02 | -2.430987E-02 |
| 51 | -2.482685E+01 | 0.000000E+00 | 5.564119E-02 | -2.322542E-01 | 5.114154E-01 | -7.179160E-01 |
| 52 | 4.924568E+00 | 0.000000E+00 | -3.460122E-02 | 7.237757E-02 | -8.255665E-02 | 6.393671E-02 |
| 61 | -1.945791E+01 | 0.000000E+00 | -8.431329E-02 | 8.840140E-02 | -1.200508E-01 | 9.423883E-02 |
| 62 | -8.917329E-01 | 0.000000E+00 | -2.537260E-02 | -1.007638E-02 | -1.692503E-03 | 4.673039E-03 |
| 71 | -9.000291E+01 | 0.000000E+00 | -1.012350E-01 | 1.865927E-02 | -1.005008E-03 | -8.593913E-04 |
| 72 | -3.808345E+00 | 0.000000E+00 | -1.281847E-01 | 9.022743E-02 | -4.799908E-02 | 1.605091E-02 |
| No. | $a_{12}$ | $a_{14}$ | $a_{16}$ | $a_{18}$ | $a_{20}$ | |
| 11 | -4.762236E-03 | 1.154459E-03 | -1.220972E-04 | | | |
| 12 | 4.571540E-02 | -1.171387E-02 | 1.259151E-03 | | | |
| 21 | 4.568466E-02 | -1.100128E-02 | 1.094670E-03 | | | |
| 22 | -2.236842E-02 | 9.798730E-03 | -1.484871E-03 | | | |
| 31 | -3.338304E-02 | 1.479240E-02 | -2.885577E-03 | | | |
| 32 | 8.664701E-02 | -2.117034E-02 | 2.120196E-03 | | | |
| 41 | 3.068434E-02 | -7.064730E-03 | 1.004755E-03 | | | |
| 42 | 1.195277E-01 | -1.395025E-01 | 8.118951E-02 | -2.461567E-02 | 3.175217E-03 | |
| 51 | 6.259124E-01 | -3.457046E-01 | 1.172837E-01 | -2.228189E-02 | 1.769062E-03 | |
| 52 | -3.939915E-02 | 1.797685E-02 | -5.453243E-03 | 9.415244E-04 | -6.829426E-05 | |
| 61 | -4.632247E-02 | 1.387570E-02 | -2.451616E-03 | 2.470093E-04 | -1.481819E-05 | |
| 62 | -2.581906E-03 | 7.014528E-04 | -1.028906E-04 | 7.764392E-06 | -2.292856E-07 | |
| 71 | 4.006788E-04 | -8.371120E-05 | 9.538466E-06 | -5.664177E-07 | 1.347785E-08 | |
| 72 | -3.401180E-03 | 4.608736E-04 | -3.890321E-05 | 1.867906E-06 | -3.905468E-08 | |

FIG. 29

| Second Example | | | | | | | |
|---|---|---|---|---|---|---|---|
| EFL=4.459 mm; HFOV=42.781degrees; TTL=5.565mm; Fno=1.550; ImgH=4.500mm | | | | | | | |
| No. | | Curvature Radius (mm) | Ape. Stop Lens Thickness Air Gap (mm) | | Material | Refractive Index | Abbe No. | Focal Length (mm) |
| | Object | Infinity | Infinity | | | | | |
| 80 | Ape. Stop | Infinity | -0.549 | | | | | |
| 11 | First Lens | 2.165 | 0.790 | T1 | Plastic | 1.545 | 55.987 | 5.468 |
| 12 | | 6.856 | 0.017 | G12 | | | | |
| 21 | Second Lens | 3.506 | 0.166 | T2 | Plastic | 1.661 | 20.412 | -28.076 |
| 22 | | 2.897 | 0.376 | G23 | | | | |
| 31 | Third Lens | -46.673 | 0.322 | T3 | Plastic | 1.545 | 55.987 | 10.445 |
| 32 | | -5.097 | 0.040 | G34 | | | | |
| 41 | Fourth Lens | -48.273 | 0.200 | T4 | Plastic | 1.661 | 20.412 | -33.219 |
| 42 | | 41.045 | 0.749 | G45 | | | | |
| 51 | Fifth Lens | -2.163 | 0.289 | T5 | Plastic | 1.661 | 20.412 | -7.789 |
| 52 | | -3.903 | 0.012 | G56 | | | | |
| 61 | Sixth Lens | 1.823 | 0.624 | T6 | Plastic | 1.545 | 55.987 | 4.751 |
| 62 | | 5.379 | 1.167 | G67 | | | | |
| 71 | Seventh Lens | -7.200 | 0.372 | T7 | Plastic | 1.545 | 55.987 | -4.149 |
| 72 | | 3.368 | 0.200 | G7F | | | | |
| 90 | Filter | Infinity | 0.101 | | | 1.560 | 51.300 | |
| | | Infinity | 0.139 | | | | | |
| 91 | Image Plane | Infinity | | | | | | |

FIG. 30

| No. | K | $a_2$ | $a_4$ | $a_6$ | $a_8$ | $a_{10}$ |
|---|---|---|---|---|---|---|
| 11 | 4.178609E-01 | 0.000000E+00 | -9.577568E-03 | 9.363537E-03 | -1.372919E-02 | 1.055382E-02 |
| 12 | 1.852742E+01 | 0.000000E+00 | -1.016774E-02 | -6.304770E-02 | 1.117770E-01 | -9.583338E-02 |
| 21 | 3.651285E+00 | 0.000000E+00 | -2.612710E-02 | -9.807136E-02 | 1.360024E-01 | -1.029935E-01 |
| 22 | 9.619830E-01 | 0.000000E+00 | -9.645547E-03 | -3.818867E-02 | 1.345945E-02 | 1.915426E-02 |
| 31 | 0.000000E+00 | 0.000000E+00 | 1.125729E-02 | 2.296779E-03 | -3.785085E-02 | 4.415680E-02 |
| 32 | -3.142182E+01 | 0.000000E+00 | 9.406732E-02 | -2.751438E-01 | 2.938064E-01 | -2.019909E-01 |
| 41 | -9.900017E+01 | 0.000000E+00 | 8.695271E-02 | -2.516803E-01 | 2.003520E-01 | -9.210922E-02 |
| 42 | 0.000000E+00 | 0.000000E+00 | 7.870102E-04 | -3.183213E-02 | -1.406639E-02 | -2.391341E-02 |
| 51 | -1.989051E+01 | 0.000000E+00 | 6.946192E-02 | -2.357024E-01 | 5.104195E-01 | -7.171145E-01 |
| 52 | 4.766388E-01 | 0.000000E+00 | -2.028039E-02 | 6.987557E-02 | -8.410330E-02 | 6.388996E-02 |
| 61 | -1.682770E+01 | 0.000000E+00 | -5.530617E-02 | 8.245219E-02 | -1.199521E-01 | 9.517941E-02 |
| 62 | 5.363005E-01 | 0.000000E+00 | -2.602578E-02 | -8.797047E-03 | -1.620256E-03 | 4.658990E-03 |
| 71 | -3.882105E+00 | 0.000000E+00 | -1.009764E-01 | 1.876733E-02 | -1.021378E-03 | -8.634484E-04 |
| 72 | -4.374709E+00 | 0.000000E+00 | -1.230673E-01 | 8.856044E-02 | -4.798208E-02 | 1.606580E-02 |
| No. | $a_{12}$ | $a_{14}$ | $a_{16}$ | $a_{18}$ | $a_{20}$ | |
| 11 | -4.798830E-03 | 1.157222E-03 | -1.085339E-04 | | | |
| 12 | 4.572640E-02 | -1.169786E-02 | 1.270833E-03 | | | |
| 21 | 4.568956E-02 | -1.098337E-02 | 1.123760E-03 | | | |
| 22 | -2.230038E-02 | 9.927159E-03 | -1.372260E-03 | | | |
| 31 | -3.370515E-02 | 1.459860E-02 | -2.909657E-03 | | | |
| 32 | 8.639610E-02 | -2.118713E-02 | 2.229869E-03 | | | |
| 41 | 3.136536E-02 | -6.619801E-03 | 1.018553E-03 | | | |
| 42 | 1.196064E-01 | -1.395443E-01 | 8.111178E-02 | -2.464494E-02 | 3.224864E-03 | |
| 51 | 6.263238E-01 | -3.457180E-01 | 1.172129E-01 | -2.228721E-02 | 1.805725E-03 | |
| 52 | -3.930669E-02 | 1.801110E-02 | -5.447860E-03 | 9.407614E-04 | -6.907751E-05 | |
| 61 | -4.619456E-02 | 1.381498E-02 | -2.482137E-03 | 2.449040E-04 | -1.027014E-05 | |
| 62 | -2.585641E-03 | 7.008912E-04 | -1.029608E-04 | 7.756952E-06 | -2.298335E-07 | |
| 71 | 4.001029E-04 | -8.377453E-05 | 9.531896E-06 | -5.664717E-07 | 1.370994E-08 | |
| 72 | -3.400554E-03 | 4.607693E-04 | -3.891158E-05 | 1.867925E-06 | -3.898133E-08 | |

FIG. 31

| Third Example | | | | | | |
|---|---|---|---|---|---|---|
| EFL=4.523 mm; HFOV=43.004degrees; TTL=5.737mm; Fno=1.550; ImgH=4.500mm | | | | | | |
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.575 | | | | |
| 11 | First Lens | 2.159 | 0.703 | T1 | Plastic | 1.545 | 55.987 | 5.357 |
| 12 | | 7.292 | 0.009 | G12 | | | |
| 21 | Second Lens | 3.511 | 0.243 | T2 | Plastic | 1.661 | 20.412 | -24.855 |
| 22 | | 2.817 | 0.338 | G23 | | | |
| 31 | Third Lens | 354.352 | 0.551 | T3 | Plastic | 1.545 | 55.987 | 9.838 |
| 32 | | -5.454 | 0.046 | G34 | | | |
| 41 | Fourth Lens | -13.885 | 0.271 | T4 | Plastic | 1.661 | 20.412 | -33.958 |
| 42 | | -36.148 | 0.611 | G45 | | | |
| 51 | Fifth Lens | -2.161 | 0.367 | T5 | Plastic | 1.661 | 20.412 | -8.450 |
| 52 | | -3.743 | 0.012 | G56 | | | |
| 61 | Sixth Lens | 2.288 | 0.723 | T6 | Plastic | 1.545 | 55.987 | 5.256 |
| 62 | | 10.000 | 1.252 | G67 | | | |
| 71 | Seventh Lens | -7.487 | 0.186 | T7 | Plastic | 1.545 | 55.987 | -4.417 |
| 72 | | 3.592 | 0.200 | G7F | | | |
| 90 | Filter | Infinity | 0.101 | | 1.560 | 51.300 | |
| | | Infinity | 0.126 | | | | |
| 91 | Image Plane | Infinity | | | | | |

FIG. 32

| No. | K | $a_2$ | $a_4$ | $a_6$ | $a_8$ | $a_{10}$ |
|---|---|---|---|---|---|---|
| 11 | 4.094266E-01 | 0.000000E+00 | -8.026838E-03 | 9.224346E-03 | -1.374336E-02 | 1.062412E-02 |
| 12 | 1.895268E+01 | 0.000000E+00 | -1.394928E-02 | -6.131577E-02 | 1.121154E-01 | -9.588031E-02 |
| 21 | 3.697611E+00 | 0.000000E+00 | -2.258844E-02 | -9.835741E-02 | 1.359144E-01 | -1.029622E-01 |
| 22 | 8.463696E-01 | 0.000000E+00 | -3.464320E-03 | -4.334167E-02 | 1.273044E-01 | 1.907564E-02 |
| 31 | 0.000000E+00 | 0.000000E+00 | 2.979987E-03 | 1.004519E-03 | -3.790764E-02 | 4.472081E-02 |
| 32 | -1.534095E+01 | 0.000000E+00 | 9.113810E-02 | -2.752423E-01 | 2.950027E-01 | -2.005931E-01 |
| 41 | 4.392882E+01 | 0.000000E+00 | 8.073266E-02 | -2.477002E-01 | 2.020364E-01 | -9.258700E-02 |
| 42 | 0.000000E+00 | 0.000000E+00 | 2.790381E-03 | -3.083916E-02 | -1.260507E-02 | -2.473469E-02 |
| 51 | -1.279898E+01 | 0.000000E+00 | 6.096291E-02 | -2.381169E-01 | 5.120419E-01 | -7.164848E-01 |
| 52 | 9.990655E-01 | 0.000000E+00 | -2.777968E-02 | 7.452310E-02 | -8.309160E-02 | 6.402545E-02 |
| 61 | -2.064171E+01 | 0.000000E+00 | -5.610372E-02 | 8.719699E-02 | -1.198984E-01 | 9.512267E-02 |
| 62 | 5.465273E+00 | 0.000000E+00 | -1.739765E-02 | -1.019467E-02 | -1.838386E-03 | 4.753300E-03 |
| 71 | 7.620676E+00 | 0.000000E+00 | -1.156380E-01 | 1.884533E-02 | -1.031284E-03 | -8.374675E-04 |
| 72 | -2.921408E+00 | 0.000000E+00 | -1.280887E-01 | 8.836767E-02 | -4.793558E-02 | 1.607328E-02 |
| No. | $a_{12}$ | $a_{14}$ | $a_{16}$ | $a_{18}$ | $a_{20}$ | |
| 11 | -4.778590E-03 | 1.149926E-03 | -1.180846E-04 | | | |
| 12 | 4.566375E-02 | -1.172128E-02 | 1.272912E-03 | | | |
| 21 | 4.570683E-02 | -1.098987E-02 | 1.108753E-03 | | | |
| 22 | -2.233843E-02 | 9.894843E-03 | -1.377789E-03 | | | |
| 31 | -3.314557E-02 | 1.492003E-02 | -2.826141E-03 | | | |
| 32 | 8.720852E-02 | -2.104829E-02 | 1.935008E-03 | | | |
| 41 | 3.026284E-02 | -7.341184E-03 | 1.024266E-03 | | | |
| 42 | 1.184927E-01 | -1.400422E-01 | 8.113271E-02 | -2.448818E-02 | 3.201259E-03 | |
| 51 | 6.262467E-01 | -3.458124E-01 | 1.171871E-01 | -2.228996E-02 | 1.799340E-03 | |
| 52 | -3.931404E-02 | 1.799836E-02 | -5.452722E-03 | 9.396371E-04 | -6.919286E-05 | |
| 61 | -4.617545E-02 | 1.381809E-02 | -2.482691E-03 | 2.447187E-04 | -1.023058E-05 | |
| 62 | -2.582321E-03 | 6.972096E-04 | -1.035831E-04 | 7.753679E-06 | -2.062366E-07 | |
| 71 | 4.052839E-04 | -8.310577E-05 | 9.563112E-06 | -5.779244E-07 | 8.809709E-09 | |
| 72 | -3.400067E-03 | 4.607311E-04 | -3.892368E-05 | 1.867413E-06 | -3.887629E-08 | |

FIG. 33

| Fourth Example |||||||
|---|---|---|---|---|---|---|
| EFL=4.452 mm; HFOV=42.491degrees; TTL=5.532mm; Fno=1.550; ImgH=4.500mm |||||||
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.561 | | | | |
| 11 | First Lens | 2.158 | 0.802 | T1 | Plastic | 1.545 | 55.987 | 5.422 |
| 12 | | 6.904 | 0.012 | G12 | | | |
| 21 | Second Lens | 3.513 | 0.151 | T2 | Plastic | 1.661 | 20.412 | -30.204 |
| 22 | | 2.940 | 0.490 | G23 | | | |
| 31 | Third Lens | -21.386 | 0.240 | T3 | Plastic | 1.545 | 55.987 | 11.694 |
| 32 | | -4.938 | 0.040 | G34 | | | |
| 41 | Fourth Lens | -25.423 | 0.213 | T4 | Plastic | 1.661 | 20.412 | -43.559 |
| 42 | | -203.729 | 0.792 | G45 | | | |
| 51 | Fifth Lens | -2.049 | 0.301 | T5 | Plastic | 1.661 | 20.412 | -7.884 |
| 52 | | -3.553 | 0.012 | G56 | | | |
| 61 | Sixth Lens | 1.957 | 0.655 | T6 | Plastic | 1.545 | 55.987 | 4.818 |
| 62 | | 6.721 | 1.302 | G67 | | | |
| 71 | Seventh Lens | -5.531 | 0.118 | T7 | Plastic | 1.545 | 55.987 | -4.311 |
| 72 | | 4.133 | 0.200 | G7F | | | |
| 90 | Filter | Infinity | 0.101 | | 1.560 | 51.300 | |
| | | Infinity | 0.103 | | | | |
| 91 | Image Plane | Infinity | | | | | |

FIG. 34

| No. | K | $a_2$ | $a_4$ | $a_6$ | $a_8$ | $a_{10}$ |
|---|---|---|---|---|---|---|
| 11 | 4.290641E-01 | 0.000000E+00 | -8.553522E-03 | 9.373338E-03 | -1.360610E-02 | 1.062087E-02 |
| 12 | 1.815860E+01 | 0.000000E+00 | -1.003310E-02 | -6.330375E-02 | 1.116310E-01 | -9.589734E-02 |
| 21 | 3.580856E+00 | 0.000000E+00 | -2.641350E-02 | -9.850206E-02 | 1.358135E-01 | -1.030639E-01 |
| 22 | 1.045833E+00 | 0.000000E+00 | -1.100963E-02 | -3.655973E-02 | 1.401674E-02 | 1.917325E-02 |
| 31 | 0.000000E+00 | 0.000000E+00 | 9.632375E-03 | 1.285619E-03 | -3.823179E-02 | 4.390041E-02 |
| 32 | -3.073699E+01 | 0.000000E+00 | 9.348886E-02 | -2.758000E-01 | 2.935046E-01 | -2.020348E-01 |
| 41 | -9.900112E+01 | 0.000000E+00 | 8.711595E-02 | -2.514049E-01 | 2.005920E-01 | -9.202251E-02 |
| 42 | 0.000000E+00 | 0.000000E+00 | 9.060745E-04 | -3.207414E-02 | -1.443141E-02 | -2.417668E-02 |
| 51 | -1.550760E+01 | 0.000000E+00 | 6.430604E-02 | -2.358755E-01 | 5.107298E-01 | -7.171413E-01 |
| 52 | 5.143122E-02 | 0.000000E+00 | -1.872909E-02 | 7.050163E-02 | -8.424350E-02 | 6.383644E-02 |
| 61 | -1.815866E+01 | 0.000000E+00 | -5.235393E-02 | 8.430119E-02 | -1.199729E-01 | 9.517084E-02 |
| 62 | 3.081644E+00 | 0.000000E+00 | -1.837512E-02 | -1.001520E-02 | -1.533684E-03 | 4.669868E-03 |
| 71 | -5.226373E+00 | 0.000000E+00 | -1.008987E-01 | 1.876050E-02 | -1.023917E-03 | -8.637674E-04 |
| 72 | -4.590035E+00 | 0.000000E+00 | -1.235634E-01 | 8.871536E-02 | -4.796244E-02 | 1.606587E-02 |
| No. | $a_{12}$ | $a_{14}$ | $a_{16}$ | $a_{18}$ | $a_{20}$ | |
| 11 | -4.777634E-03 | 1.159057E-03 | -1.120107E-04 | | | |
| 12 | 4.569427E-02 | -1.171752E-02 | 1.258051E-03 | | | |
| 21 | 4.566556E-02 | -1.098976E-02 | 1.123718E-03 | | | |
| 22 | -2.238243E-02 | 9.880706E-03 | -1.370090E-03 | | | |
| 31 | -3.389963E-02 | 1.446761E-02 | -2.982718E-03 | | | |
| 32 | 8.642123E-02 | -2.118380E-02 | 2.198087E-03 | | | |
| 41 | 3.137762E-02 | -6.619412E-03 | 1.027011E-03 | | | |
| 42 | 1.194806E-01 | -1.395835E-01 | 8.111067E-02 | -2.463748E-02 | 3.229249E-03 | |
| 51 | 6.262096E-01 | -3.457794E-01 | 1.171972E-01 | -2.228504E-02 | 1.810825E-03 | |
| 52 | -3.931405E-02 | 1.801195E-02 | -5.446869E-03 | 9.412247E-04 | -6.890233E-05 | |
| 61 | -4.619201E-02 | 1.381509E-02 | -2.482127E-03 | 2.449713E-04 | -1.023429E-05 | |
| 62 | -2.588674E-03 | 7.001585E-04 | -1.030298E-04 | 7.757186E-06 | -2.283072E-07 | |
| 71 | 4.000718E-04 | -8.377671E-05 | 9.531881E-06 | -5.664360E-07 | 1.371930E-08 | |
| 72 | -3.400641E-03 | 4.607621E-04 | -3.891165E-05 | 1.867937E-06 | -3.898251E-08 | |

FIG. 35

| Fifth Example |||||||
|---|---|---|---|---|---|---|
| EFL=4.152 mm; HFOV=43.507degrees; TTL=5.334mm; Fno=1.550; ImgH=4.500mm |||||||
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.487 | | | | |
| 11 | First Lens | 2.133 | 0.566 | T1 | Plastic | 1.545 | 55.987 | 5.383 |
| 12 | | 7.041 | 0.023 | G12 | | | |
| 21 | Second Lens | 3.514 | 0.183 | T2 | Plastic | 1.661 | 20.412 | -31.395 |
| 22 | | 2.947 | 0.412 | G23 | | | |
| 31 | Third Lens | 201.464 | 0.502 | T3 | Plastic | 1.545 | 55.987 | 10.591 |
| 32 | | -5.952 | 0.014 | G34 | | | |
| 41 | Fourth Lens | 47.545 | 0.203 | T4 | Plastic | 1.661 | 20.412 | 400.024 |
| 42 | | 57.752 | 0.797 | G45 | | | |
| 51 | Fifth Lens | -3.011 | 0.383 | T5 | Plastic | 1.545 | 55.987 | -100.076 |
| 52 | | -3.329 | 0.040 | G56 | | | |
| 61 | Sixth Lens | 2.619 | 0.615 | T6 | Plastic | 1.545 | 55.987 | 28.426 |
| 62 | | 2.889 | 1.021 | G67 | | | |
| 71 | Seventh Lens | -9.450 | 0.249 | T7 | Plastic | 1.545 | 55.987 | -5.700 |
| 72 | | 4.687 | 0.120 | G7F | | | |
| 90 | Filter | Infinity | 0.101 | | 1.560 | 51.300 | |
| | | Infinity | 0.107 | | | | |
| 91 | Image Plane | Infinity | | | | | |

FIG. 36

| No. | K | $a_2$ | $a_4$ | $a_6$ | $a_8$ | $a_{10}$ |
|---|---|---|---|---|---|---|
| 11 | 4.180505E-01 | 0.000000E+00 | -1.172647E-02 | 9.540280E-03 | -1.374840E-02 | 1.049140E-02 |
| 12 | 1.806213E+01 | 0.000000E+00 | -1.224111E-02 | -6.299017E-02 | 1.119543E-01 | -9.576883E-02 |
| 21 | 3.640173E+00 | 0.000000E+00 | -2.772505E-02 | -9.844886E-02 | 1.359317E-01 | -1.029816E-01 |
| 22 | 8.735073E-01 | 0.000000E+00 | -8.106845E-03 | -3.915529E-02 | 1.304485E-02 | 1.900449E-02 |
| 31 | 9.010355E+01 | 0.000000E+00 | 1.394338E-02 | 5.169991E-03 | -3.704331E-02 | 4.428666E-02 |
| 32 | -6.634371E+01 | 0.000000E+00 | 9.142861E-02 | -2.748489E-01 | 2.945748E-01 | -2.017246E-01 |
| 41 | 9.900107E+01 | 0.000000E+00 | 8.437557E-02 | -2.526862E-01 | 1.994333E-01 | -9.257320E-02 |
| 42 | -9.000179E+01 | 0.000000E+00 | -1.990633E-03 | -3.305454E-02 | -1.407672E-02 | -2.373655E-02 |
| 51 | -1.681478E+01 | 0.000000E+00 | 6.282221E-02 | -2.368961E-01 | 5.099963E-01 | -7.172479E-01 |
| 52 | -7.253356E-01 | 0.000000E+00 | -1.794517E-02 | 6.846492E-02 | -8.425745E-02 | 6.390434E-02 |
| 61 | -1.409900E+01 | 0.000000E+00 | -7.915089E-02 | 8.275611E-02 | -1.192712E-01 | 9.519017E-02 |
| 62 | -4.259664E+00 | 0.000000E+00 | -3.214366E-02 | -6.389052E-03 | -1.437191E-03 | 4.655417E-03 |
| 71 | -1.958060E+00 | 0.000000E+00 | -1.011592E-01 | 1.873432E-02 | -1.024050E-03 | -8.635284E-04 |
| 72 | -1.594380E+00 | 0.000000E+00 | -1.264853E-01 | 8.819666E-02 | -4.800102E-02 | 1.606694E-02 |

| No. | $a_{12}$ | $a_{14}$ | $a_{16}$ | $a_{18}$ | $a_{20}$ |
|---|---|---|---|---|---|
| 11 | -4.822213E-03 | 1.154410E-03 | -1.062434E-04 | | |
| 12 | 4.572544E-02 | -1.171413E-02 | 1.258500E-03 | | |
| 21 | 4.570553E-02 | -1.098613E-02 | 1.111157E-03 | | |
| 22 | -2.236487E-02 | 9.886358E-03 | -1.403685E-03 | | |
| 31 | -3.368845E-02 | 1.465028E-02 | -2.829827E-03 | | |
| 32 | 8.646393E-02 | -2.123719E-02 | 2.194274E-03 | | |
| 41 | 3.117296E-02 | -6.717787E-03 | 9.106052E-04 | | |
| 42 | 1.197281E-01 | -1.395154E-01 | 8.109767E-02 | -2.466723E-02 | 3.208096E-03 |
| 51 | 6.263046E-01 | -3.457454E-01 | 1.171950E-01 | -2.229170E-02 | 1.802621E-03 |
| 52 | -3.929792E-02 | 1.801447E-02 | -5.446975E-03 | 9.410022E-04 | -6.900689E-05 |
| 61 | -4.621634E-02 | 1.380887E-02 | -2.483124E-03 | 2.449899E-04 | -1.023646E-05 |
| 62 | -2.587119E-03 | 7.005778E-04 | -1.030071E-04 | 7.755728E-06 | -2.290328E-07 |
| 71 | 4.001109E-04 | -8.377446E-05 | 9.532239E-06 | -5.664196E-07 | 1.371874E-08 |
| 72 | -3.400162E-03 | 4.608214E-04 | -3.890752E-05 | 1.867887E-06 | -3.905740E-08 |

FIG. 37

| Sixth Example |||||||
|---|---|---|---|---|---|---|
| EFL=4.604 mm; HFOV=43.611degrees; TTL=5.678mm; Fno=1.550; ImgH=4.500mm |||||||
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.534 | | | | |
| 11 | First Lens | 2.291 | 0.702 | T1 | Plastic | 1.545 | 55.987 | 5.851 |
| 12 | | 7.218 | 0.028 | G12 | | | |
| 21 | Second Lens | 3.413 | 0.183 | T2 | Plastic | 1.661 | 20.412 | -38.629 |
| 22 | | 2.949 | 0.523 | G23 | | | |
| 31 | Third Lens | -26.805 | 0.398 | T3 | Plastic | 1.545 | 55.987 | 10.652 |
| 32 | | -4.806 | 0.043 | G34 | | | |
| 41 | Fourth Lens | -13.178 | 0.235 | T4 | Plastic | 1.661 | 20.412 | -32.654 |
| 42 | | -33.587 | 0.623 | G45 | | | |
| 51 | Fifth Lens | -1.884 | 0.261 | T5 | Plastic | 1.661 | 20.412 | -9.397 |
| 52 | | -2.843 | 0.030 | G56 | | | |
| 61 | Sixth Lens | 1.936 | 0.436 | T6 | Plastic | 1.545 | 55.987 | 4.922 |
| 62 | | 6.362 | 1.406 | G67 | | | |
| 71 | Seventh Lens | -4.514 | 0.359 | T7 | Plastic | 1.545 | 55.987 | -3.570 |
| 72 | | 3.530 | 0.200 | G7F | | | |
| 90 | Filter | Infinity | 0.101 | | 1.560 | 51.300 | |
| | | Infinity | 0.150 | | | | |
| 91 | Image Plane | Infinity | | | | | |

FIG. 38

| No. | K | $a_2$ | $a_4$ | $a_6$ | $a_8$ | $a_{10}$ |
|---|---|---|---|---|---|---|
| 11 | 3.413531E-01 | 0.000000E+00 | -7.032947E-03 | 1.073791E-02 | -1.421315E-02 | 1.066310E-02 |
| 12 | 1.638641E+01 | 0.000000E+00 | -6.842790E-03 | -6.499345E-02 | 1.119428E-01 | -9.570982E-02 |
| 21 | 3.285227E+00 | 0.000000E+00 | -2.063123E-02 | -9.701848E-02 | 1.352149E-01 | -1.030635E-01 |
| 22 | 1.346426E+00 | 0.000000E+00 | -8.447068E-03 | -3.716991E-02 | 1.662515E-02 | 1.895998E-02 |
| 31 | 5.349172E+01 | 0.000000E+00 | -6.979986E-03 | 1.081292E-02 | -3.752799E-02 | 4.370254E-02 |
| 32 | -1.022693E+01 | 0.000000E+00 | 9.212774E-02 | -2.746716E-01 | 2.943093E-01 | -2.015317E-01 |
| 41 | -2.330897E+01 | 0.000000E+00 | 8.502779E-02 | -2.518611E-01 | 2.004282E-01 | -9.218008E-02 |
| 42 | -4.737774E+00 | 0.000000E+00 | 4.881974E-03 | -3.327173E-02 | -1.508609E-02 | -2.511593E-02 |
| 51 | -1.300010E+01 | 0.000000E+00 | 5.415637E-02 | -2.331332E-01 | 5.127852E-01 | -7.172587E-01 |
| 52 | -1.429297E-01 | 0.000000E+00 | -2.055578E-02 | 7.110322E-02 | -8.333196E-02 | 6.411481E-02 |
| 61 | -1.720603E+01 | 0.000000E+00 | -4.538214E-02 | 8.180074E-02 | -1.192761E-01 | 9.531592E-02 |
| 62 | 2.897391E+00 | 0.000000E+00 | -2.073044E-02 | -8.341861E-03 | -1.600184E-03 | 4.672031E-03 |
| 71 | -7.947163E+00 | 0.000000E+00 | -9.728183E-02 | 1.915615E-02 | -1.011538E-03 | -8.656770E-04 |
| 72 | -9.795797E+00 | 0.000000E+00 | -1.123809E-01 | 8.926031E-02 | -4.822620E-02 | 1.605707E-02 |
| No. | $a_{12}$ | $a_{14}$ | $a_{16}$ | $a_{18}$ | $a_{20}$ | |
| 11 | -4.688501E-03 | 1.176099E-03 | -1.350295E-04 | | | |
| 12 | 4.573285E-02 | -1.172397E-02 | 1.250048E-03 | | | |
| 21 | 4.580011E-02 | -1.094499E-02 | 1.073310E-03 | | | |
| 22 | -2.294626E-02 | 9.711718E-03 | -1.216037E-03 | | | |
| 31 | -3.376267E-02 | 1.476980E-02 | -2.750022E-03 | | | |
| 32 | 8.682436E-02 | -2.108337E-02 | 2.168036E-03 | | | |
| 41 | 3.108815E-02 | -6.857503E-03 | 9.004504E-04 | | | |
| 42 | 1.192655E-01 | -1.393955E-01 | 8.128091E-02 | -2.462043E-02 | 3.119980E-03 | |
| 51 | 6.261265E-01 | -3.456991E-01 | 1.172582E-01 | -2.227393E-02 | 1.805598E-03 | |
| 52 | -3.926196E-02 | 1.801758E-02 | -5.447891E-03 | 9.401392E-04 | -6.943229E-05 | |
| 61 | -4.619984E-02 | 1.380975E-02 | -2.482682E-03 | 2.450995E-04 | -1.015799E-05 | |
| 62 | -2.581570E-03 | 7.014634E-04 | -1.029253E-04 | 7.751826E-06 | -2.321791E-07 | |
| 71 | 3.996372E-04 | -8.383133E-05 | 9.527588E-06 | -5.663873E-07 | 1.382761E-08 | |
| 72 | -3.398669E-03 | 4.609518E-04 | -3.891780E-05 | 1.866022E-06 | -3.890518E-08 | |

FIG.39

| Seventh Example |||||||
|---|---|---|---|---|---|---|
| EFL=4.481 mm; HFOV= 43.702degrees; TTL=5.584mm; Fno=1.550; ImgH=4.500mm |||||||
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.476 | | | | |
| 11 | First Lens | 2.152 | 0.614 | T1 | Plastic | 1.545 | 55.987 | 5.517 |
| 12 | | 6.769 | 0.044 | G12 | | | |
| 21 | Second Lens | 3.487 | 0.189 | T2 | Plastic | 1.661 | 20.412 | -40.490 |
| 22 | | 3.021 | 0.322 | G23 | | | |
| 31 | Third Lens | 31.429 | 0.522 | T3 | Plastic | 1.545 | 55.987 | 9.668 |
| 32 | | -6.311 | 0.030 | G34 | | | |
| 41 | Fourth Lens | -181.774 | 0.221 | T4 | Plastic | 1.661 | 20.412 | -31.591 |
| 42 | | 23.853 | 0.610 | G45 | | | |
| 51 | Fifth Lens | -3.253 | 0.572 | T5 | Plastic | 1.661 | 20.412 | -143.736 |
| 52 | | -3.604 | 0.090 | G56 | | | |
| 61 | Sixth Lens | 2.892 | 0.538 | T6 | Plastic | 1.545 | 55.987 | 12.647 |
| 62 | | 4.646 | 1.064 | G67 | | | |
| 71 | Seventh Lens | -6.957 | 0.291 | T7 | Plastic | 1.545 | 55.987 | -4.086 |
| 72 | | 3.335 | 0.200 | G7F | | | |
| 90 | Filter | Infinity | 0.101 | | 1.560 | 51.300 | |
| | | Infinity | 0.175 | | | | |
| 91 | Image Plane | Infinity | | | | | |

FIG. 40

| No. | K | $a_2$ | $a_4$ | $a_6$ | $a_8$ | $a_{10}$ |
|---|---|---|---|---|---|---|
| 11 | 4.035689E-01 | 0.000000E+00 | -9.915468E-03 | 9.269770E-03 | -1.403175E-02 | 1.053581E-02 |
| 12 | 1.807084E+01 | 0.000000E+00 | -1.022663E-02 | -6.544024E-02 | 1.119340E-01 | -9.571886E-02 |
| 21 | 3.582875E+00 | 0.000000E+00 | -3.017287E-02 | -9.817063E-02 | 1.354930E-01 | -1.030035E-01 |
| 22 | 4.520011E-01 | 0.000000E+00 | -1.236172E-02 | -4.171538E-02 | 1.373077E-02 | 1.894910E-02 |
| 31 | -8.870520E+01 | 0.000000E+00 | 8.161947E-03 | 6.665381E-03 | -3.901093E-02 | 4.383912E-02 |
| 32 | -3.180542E+01 | 0.000000E+00 | 9.338439E-02 | -2.755834E-01 | 2.943045E-01 | -2.012972E-01 |
| 41 | 9.899942E+01 | 0.000000E+00 | 7.983973E-02 | -2.496780E-01 | 2.012012E-01 | -9.267574E-02 |
| 42 | 8.646738E+01 | 0.000000E+00 | 2.329129E-03 | -2.860812E-02 | -1.400349E-02 | -2.469736E-02 |
| 51 | -3.781684E+00 | 0.000000E+00 | 6.784062E-02 | -2.369330E-01 | 5.096280E-01 | -7.168737E-01 |
| 52 | 1.583458E+00 | 0.000000E+00 | -4.333081E-02 | 7.854840E-02 | -8.352848E-02 | 6.376328E-02 |
| 61 | -1.868138E+01 | 0.000000E+00 | -4.682867E-02 | 8.196560E-02 | -1.199562E-01 | 9.527505E-02 |
| 62 | 1.169973E+00 | 0.000000E+00 | -1.889701E-02 | -9.881757E-03 | -1.673620E-03 | 4.720001E-03 |
| 71 | -1.573161E+01 | 0.000000E+00 | -1.003236E-01 | 1.866445E-02 | -1.030316E-03 | -8.631345E-04 |
| 72 | -2.726692E+00 | 0.000000E+00 | -1.266455E-01 | 8.875894E-02 | -4.794430E-02 | 1.606695E-02 |
| No. | $a_{12}$ | $a_{14}$ | $a_{16}$ | $a_{18}$ | $a_{20}$ | |
| 11 | -4.801597E-03 | 1.150102E-03 | -1.184687E-04 | | | |
| 12 | 4.569769E-02 | -1.173193E-02 | 1.269249E-03 | | | |
| 21 | 4.578958E-02 | -1.092049E-02 | 1.114842E-03 | | | |
| 22 | -2.258625E-02 | 9.823201E-03 | -1.280896E-03 | | | |
| 31 | -3.334036E-02 | 1.498614E-02 | -2.723133E-03 | | | |
| 32 | 8.685003E-02 | -2.110983E-02 | 2.149586E-03 | | | |
| 41 | 3.067136E-02 | -6.923362E-03 | 1.012362E-03 | | | |
| 42 | 1.192931E-01 | -1.395651E-01 | 8.113853E-02 | -2.464486E-02 | 3.206243E-03 | |
| 51 | 6.262395E-01 | -3.458648E-01 | 1.172215E-01 | -2.226869E-02 | 1.792721E-03 | |
| 52 | -3.931861E-02 | 1.801410E-02 | -5.446897E-03 | 9.408715E-04 | -6.904212E-05 | |
| 61 | -4.617783E-02 | 1.381654E-02 | -2.481658E-03 | 2.449672E-04 | -1.034650E-05 | |
| 62 | -2.578205E-03 | 7.008723E-04 | -1.030564E-04 | 7.743244E-06 | -2.319911E-07 | |
| 71 | 4.002432E-04 | -8.375666E-05 | 9.532941E-06 | -5.666130E-07 | 1.364569E-08 | |
| 72 | -3.400854E-03 | 4.607121E-04 | -3.891764E-05 | 1.867791E-06 | -3.886902E-08 | |

FIG. 41

| Eighth Example ||||||||
|---|---|---|---|---|---|---|---|
| EFL=4.540 mm; HFOV=43.517degrees; TTL=5.966 mm; Fno=1.550; ImgH=4.500mm ||||||||
| No. | | Curvature Radius (mm) | Ape. Stop Lens Thickness Air Gap (mm) | | Material | Refractive Index | Abbe No. | Focal Length (mm) |
| | Object | Infinity | Infinity | | | | | |
| 80 | Ape. Stop | Infinity | -0.256 | | | | | |
| 11 | First Lens | 3.344 | 0.374 | T1 | Plastic | 1.545 | 55.987 | 10.791 |
| 12 | | 7.421 | 0.028 | G12 | | | | |
| 21 | Second Lens | 3.198 | 0.553 | T2 | Plastic | 1.661 | 20.412 | 284.536 |
| 22 | | 3.028 | 0.338 | G23 | | | | |
| 31 | Third Lens | 11.756 | 0.600 | T3 | Plastic | 1.545 | 55.987 | 6.092 |
| 32 | | -4.558 | 0.040 | G34 | | | | |
| 41 | Fourth Lens | -63.655 | 0.293 | T4 | Plastic | 1.661 | 20.412 | -24.446 |
| 42 | | 21.969 | 0.682 | G45 | | | | |
| 51 | Fifth Lens | -2.292 | 0.360 | T5 | Plastic | 1.661 | 20.412 | -11.913 |
| 52 | | -3.424 | 0.032 | G56 | | | | |
| 61 | Sixth Lens | 1.890 | 0.545 | T6 | Plastic | 1.545 | 55.987 | 6.084 |
| 62 | | 3.933 | 1.103 | G67 | | | | |
| 71 | Seventh Lens | -146.475 | 0.436 | T7 | Plastic | 1.545 | 55.987 | -4.456 |
| 72 | | 2.478 | 0.150 | G7F | | | | |
| 90 | Filter | Infinity | 0.101 | | | 1.560 | 51.300 | |
| | | Infinity | 0.330 | | | | | |
| 91 | Image Plane | Infinity | | | | | | |

FIG. 42

| No. | K | $a_2$ | $a_4$ | $a_6$ | $a_8$ | $a_{10}$ |
|---|---|---|---|---|---|---|
| 11 | 4.590116E-01 | 0.000000E+00 | -1.587743E-02 | 8.574240E-03 | -1.394207E-02 | 1.064564E-02 |
| 12 | 2.011357E+01 | 0.000000E+00 | -2.435123E-02 | -6.454230E-02 | 1.137407E-01 | -9.568771E-02 |
| 21 | 2.943901E+00 | 0.000000E+00 | -9.765010E-03 | -9.725682E-02 | 1.348004E-01 | -1.032902E-01 |
| 22 | 1.554360E+00 | 0.000000E+00 | 1.149040E-02 | -4.066766E-02 | 1.087273E-02 | 1.891592E-02 |
| 31 | 5.671489E+01 | 0.000000E+00 | 1.033756E-02 | 6.238879E-03 | -3.729246E-02 | 4.380616E-02 |
| 32 | -1.709885E+00 | 0.000000E+00 | 8.896477E-02 | -2.678183E-01 | 2.945461E-01 | -2.018291E-01 |
| 41 | -9.618207E+01 | 0.000000E+00 | 8.260182E-02 | -2.479548E-01 | 2.022730E-01 | -9.236626E-02 |
| 42 | -8.451425E+01 | 0.000000E+00 | 1.798381E-02 | -2.972314E-02 | -1.605539E-02 | -2.553383E-02 |
| 51 | -1.150894E+01 | 0.000000E+00 | 9.272299E-02 | -2.361572E-01 | 5.119928E-01 | -7.163876E-01 |
| 52 | -1.299870E-01 | 0.000000E+00 | -2.034655E-02 | 7.765149E-02 | -8.368891E-02 | 6.368869E-02 |
| 61 | -1.111034E+01 | 0.000000E+00 | -4.054301E-02 | 7.978204E-02 | -1.199273E-01 | 9.526511E-02 |
| 62 | 1.133512E-01 | 0.000000E+00 | -1.786989E-02 | -1.181416E-02 | -1.510389E-03 | 4.740708E-03 |
| 71 | 8.285991E+01 | 0.000000E+00 | -1.195950E-01 | 1.837376E-02 | -9.365844E-04 | -8.514091E-04 |
| 72 | -2.460302E+00 | 0.000000E+00 | -1.334686E-01 | 8.945967E-02 | -4.793048E-02 | 1.606349E-02 |
| No. | $a_{12}$ | $a_{14}$ | $a_{16}$ | $a_{18}$ | $a_{20}$ | |
| 11 | -4.718370E-03 | 1.183095E-03 | -1.123200E-04 | | | |
| 12 | 4.569633E-02 | -1.174702E-02 | 1.270557E-03 | | | |
| 21 | 4.570691E-02 | -1.098267E-02 | 1.069559E-03 | | | |
| 22 | -2.199173E-02 | 9.908021E-03 | -1.667204E-03 | | | |
| 31 | -3.383006E-02 | 1.470529E-02 | -2.750821E-03 | | | |
| 32 | 8.664153E-02 | -2.112546E-02 | 2.124272E-03 | | | |
| 41 | 3.043456E-02 | -7.226348E-03 | 9.304357E-04 | | | |
| 42 | 1.191103E-01 | -1.395679E-01 | 8.136310E-02 | -2.455245E-02 | 3.073196E-03 | |
| 51 | 6.263104E-01 | -3.458309E-01 | 1.171712E-01 | -2.228124E-02 | 1.823222E-03 | |
| 52 | -3.937791E-02 | 1.799598E-02 | -5.448788E-03 | 9.417927E-04 | -6.851435E-05 | |
| 61 | -4.620288E-02 | 1.382100E-02 | -2.479145E-03 | 2.460755E-04 | -1.115821E-05 | |
| 62 | -2.575646E-03 | 7.006062E-04 | -1.032229E-04 | 7.708842E-06 | -2.395659E-07 | |
| 71 | 4.009328E-04 | -8.381938E-05 | 9.525072E-06 | -5.666928E-07 | 1.373215E-08 | |
| 72 | -3.401209E-03 | 4.607206E-04 | -3.891577E-05 | 1.868066E-06 | -3.885991E-08 | |

FIG. 43

| Ninth Example ||||||||
|---|---|---|---|---|---|---|---|
| EFL=4.489 mm; HFOV=43.690degrees; TTL=5.694mm; Fno=1.550; ImgH=4.500mm ||||||||
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.503 | | | | |
| 11 | First Lens | 2.269 | 0.727 | T1 Plastic | 1.545 | 55.987 | 5.816 |
| 12 | | 7.043 | 0.030 | G12 | | | |
| 21 | Second Lens | 3.559 | 0.191 | T2 Plastic | 1.661 | 20.412 | -41.123 |
| 22 | | 3.083 | 0.389 | G23 | | | |
| 31 | Third Lens | -490.550 | 0.557 | T3 Plastic | 1.545 | 55.987 | 11.185 |
| 32 | | -6.037 | 0.030 | G34 | | | |
| 41 | Fourth Lens | -25.473 | 0.200 | T4 Plastic | 1.661 | 20.412 | -40.118 |
| 42 | | -529.118 | 0.561 | G45 | | | |
| 51 | Fifth Lens | -2.238 | 0.289 | T5 Plastic | 1.661 | 20.412 | -11.001 |
| 52 | | -3.386 | 0.029 | G56 | | | |
| 61 | Sixth Lens | 2.252 | 0.512 | T6 Plastic | 1.545 | 55.987 | 5.881 |
| 62 | | 6.920 | 1.499 | G67 | | | |
| 71 | Seventh Lens | -6.668 | 0.245 | T7 Plastic | 1.545 | 55.987 | -4.549 |
| 72 | | 4.013 | 0.200 | G7F | | | |
| 90 | Filter | Infinity | 0.101 | | 1.560 | 51.300 | |
| | | Infinity | 0.133 | | | | |
| 91 | Image Plane | Infinity | | | | | |

FIG. 44

| No. | K | $a_2$ | $a_4$ | $a_6$ | $a_8$ | $a_{10}$ |
|---|---|---|---|---|---|---|
| 11 | 4.052828E-01 | 0.000000E+00 | -8.412104E-03 | 9.302748E-03 | -1.368949E-02 | 1.065832E-02 |
| 12 | 1.892951E+01 | 0.000000E+00 | -1.312992E-02 | -6.383842E-02 | 1.119043E-01 | -9.577063E-02 |
| 21 | 3.521125E+00 | 0.000000E+00 | -2.918889E-02 | -9.830764E-02 | 1.357728E-01 | -1.030223E-01 |
| 22 | 6.475809E-01 | 0.000000E+00 | -1.195891E-02 | -3.962325E-02 | 1.365210E-02 | 1.915870E-02 |
| 31 | 8.910777E+01 | 0.000000E+00 | 2.590811E-03 | 6.760959E-03 | -3.699371E-02 | 4.428584E-02 |
| 32 | -4.163997E+01 | 0.000000E+00 | 9.558982E-02 | -2.751411E-01 | 2.942217E-01 | -2.015200E-01 |
| 41 | 4.032362E+01 | 0.000000E+00 | 8.489613E-02 | -2.516255E-01 | 2.005276E-01 | -9.215029E-02 |
| 42 | 7.307340E+01 | 0.000000E+00 | -1.091191E-03 | -3.178078E-02 | -1.417033E-02 | -2.413639E-02 |
| 51 | -1.339162E+01 | 0.000000E+00 | 7.286120E-02 | -2.352899E-01 | 5.107462E-01 | -7.169428E-01 |
| 52 | -7.125161E-01 | 0.000000E+00 | -1.787588E-02 | 7.329685E-02 | -8.363756E-02 | 6.392331E-02 |
| 61 | -2.099742E+01 | 0.000000E+00 | -4.992159E-02 | 8.138470E-02 | -1.193325E-01 | 9.535913E-02 |
| 62 | 1.771196E+00 | 0.000000E+00 | -1.892858E-02 | -9.231418E-03 | -1.494197E-03 | 4.689308E-03 |
| 71 | -3.405558E+00 | 0.000000E+00 | -1.003237E-01 | 1.890883E-02 | -1.011511E-03 | -8.630959E-04 |
| 72 | -9.739730E-01 | 0.000000E+00 | -1.213045E-01 | 8.842217E-02 | -4.806385E-02 | 1.606049E-02 |
| No. | $a_{12}$ | $a_{14}$ | $a_{16}$ | $a_{18}$ | $a_{20}$ | |
| 11 | -4.751355E-03 | 1.160009E-03 | -1.210981E-04 | | | |
| 12 | 4.570228E-02 | -1.173650E-02 | 1.246254E-03 | | | |
| 21 | 4.572014E-02 | -1.097009E-02 | 1.115510E-03 | | | |
| 22 | -2.240043E-02 | 9.846888E-03 | -1.403739E-03 | | | |
| 31 | -3.358829E-02 | 1.473366E-02 | -2.817934E-03 | | | |
| 32 | 8.678742E-02 | -2.106390E-02 | 2.214048E-03 | | | |
| 41 | 3.123056E-02 | -6.755068E-03 | 9.056658E-04 | | | |
| 42 | 1.195363E-01 | -1.395328E-01 | 8.112578E-02 | -2.465746E-02 | 3.192467E-03 | |
| 51 | 6.263959E-01 | -3.457254E-01 | 1.171980E-01 | -2.229237E-02 | 1.806362E-03 | |
| 52 | -3.930750E-02 | 1.800891E-02 | -5.448423E-03 | 9.403853E-04 | -6.926099E-05 | |
| 61 | -4.619081E-02 | 1.380995E-02 | -2.482874E-03 | 2.450613E-04 | -1.014710E-05 | |
| 62 | -2.580620E-03 | 7.013948E-04 | -1.029486E-04 | 7.748771E-06 | -2.324585E-07 | |
| 71 | 4.000840E-04 | -8.378484E-05 | 9.530001E-06 | -5.667502E-07 | 1.367406E-08 | |
| 72 | -3.400668E-03 | 4.608847E-04 | -3.889623E-05 | 1.867478E-06 | -3.912443E-08 | |

FIG. 45

| Tenth Example ||||||||
|---|---|---|---|---|---|---|---|
| EFL=4.303 mm; HFOV=43.256; TTL=5.385mm; Fno=1.550; ImgH=4.500mm ||||||||
| No. | | Curvature Radius (mm) | Ape. Stop Lens Thickness Air Gap (mm) | Material | Refractive Index | Abbe No. | Focal Length (mm) |
| | Object | Infinity | Infinity | | | | |
| 80 | Ape. Stop | Infinity | -0.487 | | | | |
| 11 | First Lens | 2.128 | 0.590 | T1 | Plastic | 1.545 | 55.987 | 5.364 |
| 12 | | 7.008 | 0.020 | G12 | | | |
| 21 | Second Lens | 3.496 | 0.212 | T2 | Plastic | 1.661 | 20.412 | -33.081 |
| 22 | | 2.945 | 0.431 | G23 | | | |
| 31 | Third Lens | 744.038 | 0.508 | T3 | Plastic | 1.545 | 55.987 | 8.758 |
| 32 | | -4.814 | 0.030 | G34 | | | |
| 41 | Fourth Lens | -378.869 | 0.216 | T4 | Plastic | 1.661 | 20.412 | -74.640 |
| 42 | | 57.347 | 0.757 | G45 | | | |
| 51 | Fifth Lens | -3.094 | 0.360 | T5 | Plastic | 1.545 | 55.987 | -17240000000.000 |
| 52 | | -3.221 | 0.083 | G56 | | | |
| 61 | Sixth Lens | 3.506 | 0.602 | T6 | Plastic | 1.545 | 55.987 | -200.185 |
| 62 | | 3.191 | 1.023 | G67 | | | |
| 71 | Seventh Lens | -11.144 | 0.221 | T7 | Plastic | 1.545 | 55.987 | -6.888 |
| 72 | | 5.721 | 0.150 | G7F | | | |
| 90 | Filter | Infinity | 0.101 | | 1.560 | 51.300 | |
| | | Infinity | 0.081 | | | | |
| 91 | Image Plane | Infinity | | | | | |

FIG. 46

| No. | K | $a_2$ | $a_4$ | $a_6$ | $a_8$ | $a_{10}$ |
|---|---|---|---|---|---|---|
| 11 | 4.206279E-01 | 0.000000E+00 | -1.135318E-02 | 9.681132E-03 | -1.373157E-02 | 1.047947E-02 |
| 12 | 1.804694E+01 | 0.000000E+00 | -1.223835E-02 | -6.302466E-02 | 1.119929E-01 | -9.573281E-02 |
| 21 | 3.645537E+00 | 0.000000E+00 | -2.740586E-02 | -9.841405E-02 | 1.358832E-01 | -1.030325E-01 |
| 22 | 8.126489E-01 | 0.000000E+00 | -8.656409E-03 | -3.936838E-02 | 1.296425E-02 | 1.899237E-02 |
| 31 | 8.372694E+01 | 0.000000E+00 | 1.313474E-02 | 4.744967E-03 | -3.716549E-02 | 4.426140E-02 |
| 32 | -4.835974E+01 | 0.000000E+00 | 9.136740E-02 | -2.749273E-01 | 2.944917E-01 | -2.017817E-01 |
| 41 | 9.900038E+01 | 0.000000E+00 | 8.525226E-02 | -2.527183E-01 | 1.993795E-01 | -9.261712E-02 |
| 42 | -8.999920E+01 | 0.000000E+00 | -3.490807E-03 | -3.300951E-02 | -1.404025E-02 | -2.375664E-02 |
| 51 | -1.570229E+01 | 0.000000E+00 | 5.581303E-02 | -2.383956E-01 | 5.100988E-01 | -7.171272E-01 |
| 52 | -1.207935E+00 | 0.000000E+00 | -1.599944E-02 | 6.842963E-02 | -8.436949E-02 | 6.388616E-02 |
| 61 | -1.670225E+01 | 0.000000E+00 | -8.580426E-02 | 8.313349E-02 | -1.189968E-01 | 9.523349E-02 |
| 62 | -5.018076E+00 | 0.000000E+00 | -3.420387E-02 | -6.611654E-03 | -1.453351E-03 | 4.654404E-03 |
| 71 | -1.193249E+00 | 0.000000E+00 | -1.012803E-01 | 1.871309E-02 | -1.027001E-03 | -8.638424E-04 |
| 72 | -1.751856E+00 | 0.000000E+00 | -1.266119E-01 | 8.823416E-02 | -4.799623E-02 | 1.606752E-02 |
| No. | $a_{12}$ | $a_{14}$ | $a_{16}$ | $a_{18}$ | $a_{20}$ | |
| 11 | -4.832424E-03 | 1.148886E-03 | -1.087669E-04 | | | |
| 12 | 4.574313E-02 | -1.171008E-02 | 1.254969E-03 | | | |
| 21 | 4.568083E-02 | -1.098912E-02 | 1.118047E-03 | | | |
| 22 | -2.236691E-02 | 9.874581E-03 | -1.424664E-03 | | | |
| 31 | -3.368629E-02 | 1.466107E-02 | -2.818506E-03 | | | |
| 32 | 8.644074E-02 | -2.124534E-02 | 2.191503E-03 | | | |
| 41 | 3.115481E-02 | -6.745755E-03 | 8.881402E-04 | | | |
| 42 | 1.197007E-01 | -1.395353E-01 | 8.108863E-02 | -2.466895E-02 | 3.209862E-03 | |
| 51 | 6.262808E-01 | -3.458072E-01 | 1.171532E-01 | -2.230979E-02 | 1.797043E-03 | |
| 52 | -3.929998E-02 | 1.801419E-02 | -5.446938E-03 | 9.410560E-04 | -6.897825E-05 | |
| 61 | -4.621238E-02 | 1.381066E-02 | -2.482268E-03 | 2.452664E-04 | -1.016989E-05 | |
| 62 | -2.587246E-03 | 7.005784E-04 | -1.030051E-04 | 7.756329E-06 | -2.289155E-07 | |
| 71 | 4.000842E-04 | -8.377709E-05 | 9.531993E-06 | -5.664428E-07 | 1.371646E-08 | |
| 72 | -3.400107E-03 | 4.608262E-04 | -3.890753E-05 | 1.867841E-06 | -3.906897E-08 | |

FIG. 47

| Eleventh Example ||||||||
|---|---|---|---|---|---|---|---|
| EFL=4.424 mm; HFOV=43.783degrees; TTL=6.094mm; Fno=1.550; ImgH=4.500mm ||||||||
| No. | | Curvature Radius (mm) | Ape. Stop Lens Thickness Air Gap (mm) | | Material | Refractive Index | Abbe No. | Focal Length (mm) |
| | Object | Infinity | Infinity | | | | | |
| 80 | Ape. Stop | Infinity | -0.442 | | | | | |
| 11 | First Lens | 2.355 | 0.769 | T1 | Plastic | 1.545 | 55.987 | 5.869 |
| 12 | | 7.849 | 0.031 | G12 | | | | |
| 21 | Second Lens | 3.352 | 0.210 | T2 | Plastic | 1.661 | 20.412 | -33.374 |
| 22 | | 2.840 | 0.412 | G23 | | | | |
| 31 | Third Lens | -14.887 | 0.518 | T3 | Plastic | 1.545 | 55.987 | 9.495 |
| 32 | | -3.894 | 0.027 | G34 | | | | |
| 41 | Fourth Lens | -436.597 | 0.193 | T4 | Plastic | 1.661 | 20.412 | -24.539 |
| 42 | | 17.013 | 0.599 | G45 | | | | |
| 51 | Fifth Lens | -1.694 | 0.398 | T5 | Plastic | 1.661 | 20.412 | -7.049 |
| 52 | | -2.897 | 0.024 | G56 | | | | |
| 61 | Sixth Lens | 1.916 | 0.730 | T6 | Plastic | 1.545 | 55.987 | 4.812 |
| 62 | | 6.114 | 1.476 | G67 | | | | |
| 71 | Seventh Lens | -6.924 | 0.338 | T7 | Plastic | 1.545 | 55.987 | 50.057 |
| 72 | | -5.620 | 0.200 | G7F | | | | |
| 90 | Filter | Infinity | 0.101 | | | 1.560 | 51.300 | |
| | | Infinity | 0.067 | | | | | |
| 91 | Image Plane | Infinity | | | | | | |

FIG. 48

| No. | K | $a_2$ | $a_4$ | $a_6$ | $a_8$ | $a_{10}$ |
|---|---|---|---|---|---|---|
| 11 | 2.759282E-01 | 0.000000E+00 | -7.945839E-03 | 1.079456E-02 | -1.452526E-02 | 1.056852E-02 |
| 12 | 1.438639E+01 | 0.000000E+00 | -8.365378E-03 | -6.481720E-02 | 1.119809E-01 | -9.568912E-02 |
| 21 | 3.285077E+00 | 0.000000E+00 | -1.976384E-02 | -9.678414E-02 | 1.349306E-01 | -1.033154E-01 |
| 22 | 1.201599E+00 | 0.000000E+00 | -4.999798E-03 | -4.054921E-02 | 1.529182E-02 | 1.835571E-02 |
| 31 | 4.193134E+01 | 0.000000E+00 | -3.386458E-03 | 1.009931E-02 | -3.758809E-02 | 4.416454E-02 |
| 32 | -8.841797E+00 | 0.000000E+00 | 9.466949E-02 | -2.721634E-01 | 2.955122E-01 | -2.009410E-01 |
| 41 | 6.629720E+01 | 0.000000E+00 | 8.241587E-02 | -2.536143E-01 | 1.996331E-01 | -9.258285E-02 |
| 42 | -8.520381E+01 | 0.000000E+00 | 2.343643E-03 | -3.437634E-02 | -1.563356E-02 | -2.540433E-02 |
| 51 | -9.240977E+00 | 0.000000E+00 | 4.950636E-02 | -2.326299E-01 | 5.128908E-01 | -7.171112E-01 |
| 52 | 4.628904E-01 | 0.000000E+00 | -2.899874E-02 | 7.085789E-02 | -8.292583E-02 | 6.418443E-02 |
| 61 | -1.238184E+01 | 0.000000E+00 | -4.887262E-02 | 8.114616E-02 | -1.193109E-01 | 9.532362E-02 |
| 62 | 2.124824E+00 | 0.000000E+00 | -2.310894E-02 | -8.221402E-03 | -1.602165E-03 | 4.669482E-03 |
| 71 | -1.307279E-01 | 0.000000E+00 | -9.953584E-02 | 1.897958E-02 | -1.021865E-03 | -8.651934E-04 |
| 72 | -9.002483E+01 | 0.000000E+00 | -8.326234E-02 | 8.433248E-02 | -4.817345E-02 | 1.608142E-02 |
| No. | $a_{12}$ | $a_{14}$ | $a_{16}$ | $a_{18}$ | $a_{20}$ | |
| 11 | -4.713211E-03 | 1.170672E-03 | -1.359261E-04 | | | |
| 12 | 4.574332E-02 | -1.172457E-02 | 1.240370E-03 | | | |
| 21 | 4.569418E-02 | -1.094023E-02 | 1.068697E-03 | | | |
| 22 | -2.318665E-02 | 9.688869E-03 | -1.154701E-03 | | | |
| 31 | -3.331899E-02 | 1.508888E-02 | -2.568487E-03 | | | |
| 32 | 8.710390E-02 | -2.101112E-02 | 2.210113E-03 | | | |
| 41 | 3.089203E-02 | -6.941841E-03 | 8.957878E-04 | | | |
| 42 | 1.191823E-01 | -1.393982E-01 | 8.127708E-02 | -2.462685E-02 | 3.109422E-03 | |
| 51 | 6.260758E-01 | -3.457037E-01 | 1.172665E-01 | -2.227510E-02 | 1.802324E-03 | |
| 52 | -3.925638E-02 | 1.801692E-02 | -5.447882E-03 | 9.401016E-04 | -6.944401E-05 | |
| 61 | -4.619783E-02 | 1.381004E-02 | -2.482655E-03 | 2.450981E-04 | -1.015918E-05 | |
| 62 | -2.582004E-03 | 7.014091E-04 | -1.029309E-04 | 7.751284E-06 | -2.322261E-07 | |
| 71 | 3.997294E-04 | -8.382045E-05 | 9.528506E-06 | -5.663484E-07 | 1.382122E-08 | |
| 72 | -3.397284E-03 | 4.607981E-04 | -3.893553E-05 | 1.865405E-06 | -3.875352E-08 | |

FIG. 49

| Example | 1 | 2 | 3 | 4 | 5 | 6 | 7 | 8 | 9 | 10 | 11 |
|---|---|---|---|---|---|---|---|---|---|---|---|
| T1 | 0.661 | 0.790 | 0.703 | 0.802 | 0.566 | 0.702 | 0.614 | 0.374 | 0.727 | 0.590 | 0.769 |
| G12 | 0.012 | 0.017 | 0.009 | 0.012 | 0.023 | 0.028 | 0.044 | 0.028 | 0.030 | 0.020 | 0.031 |
| T2 | 0.229 | 0.166 | 0.243 | 0.151 | 0.183 | 0.183 | 0.189 | 0.553 | 0.191 | 0.212 | 0.210 |
| G23 | 0.440 | 0.376 | 0.338 | 0.490 | 0.412 | 0.523 | 0.322 | 0.338 | 0.389 | 0.431 | 0.412 |
| T3 | 0.396 | 0.322 | 0.551 | 0.240 | 0.502 | 0.398 | 0.522 | 0.600 | 0.557 | 0.508 | 0.518 |
| G34 | 0.040 | 0.040 | 0.046 | 0.040 | 0.014 | 0.043 | 0.030 | 0.040 | 0.030 | 0.030 | 0.027 |
| T4 | 0.217 | 0.200 | 0.271 | 0.213 | 0.203 | 0.235 | 0.221 | 0.293 | 0.200 | 0.216 | 0.193 |
| G45 | 0.715 | 0.749 | 0.611 | 0.792 | 0.797 | 0.623 | 0.610 | 0.682 | 0.561 | 0.757 | 0.599 |
| T5 | 0.266 | 0.289 | 0.367 | 0.301 | 0.383 | 0.261 | 0.572 | 0.360 | 0.289 | 0.360 | 0.398 |
| G56 | 0.012 | 0.012 | 0.012 | 0.012 | 0.040 | 0.030 | 0.090 | 0.032 | 0.029 | 0.083 | 0.024 |
| T6 | 0.727 | 0.624 | 0.723 | 0.655 | 0.615 | 0.436 | 0.538 | 0.545 | 0.512 | 0.602 | 0.730 |
| G67 | 0.545 | 1.167 | 1.252 | 1.302 | 1.021 | 1.406 | 1.064 | 1.103 | 1.499 | 1.023 | 1.476 |
| T7 | 0.705 | 0.372 | 0.186 | 0.118 | 0.249 | 0.359 | 0.291 | 0.436 | 0.245 | 0.221 | 0.338 |
| G7F | 0.200 | 0.200 | 0.200 | 0.200 | 0.120 | 0.200 | 0.200 | 0.150 | 0.200 | 0.150 | 0.200 |
| TF | 0.101 | 0.101 | 0.101 | 0.101 | 0.101 | 0.101 | 0.101 | 0.101 | 0.101 | 0.101 | 0.101 |
| GFP | 0.241 | 0.139 | 0.126 | 0.103 | 0.107 | 0.150 | 0.175 | 0.330 | 0.133 | 0.081 | 0.067 |
| BFL | 0.541 | 0.440 | 0.426 | 0.404 | 0.328 | 0.451 | 0.475 | 0.581 | 0.434 | 0.332 | 0.367 |
| EFL | 4.715 | 4.459 | 4.523 | 4.452 | 4.152 | 4.604 | 4.481 | 4.540 | 4.489 | 4.303 | 4.424 |
| TL | 4.964 | 5.126 | 5.311 | 5.128 | 5.006 | 5.227 | 5.108 | 5.385 | 5.260 | 5.054 | 5.726 |
| TTL | 5.505 | 5.565 | 5.737 | 5.532 | 5.334 | 5.678 | 5.584 | 5.966 | 5.694 | 5.385 | 6.094 |
| ALT | 3.200 | 2.764 | 3.043 | 2.481 | 2.700 | 2.574 | 2.947 | 3.161 | 2.722 | 2.709 | 3.156 |
| AAG | 1.764 | 2.362 | 2.267 | 2.647 | 2.306 | 2.654 | 2.161 | 2.224 | 2.538 | 2.344 | 2.570 |

FIG. 50

| Example | 1 | 2 | 3 | 4 | 5 | 6 | 7 | 8 | 9 | 10 | 11 |
|---|---|---|---|---|---|---|---|---|---|---|---|
| (G45+T5+G56+T6+G67+T7)/(T1+G12+T2) | 3.294 | 3.299 | 3.298 | 3.298 | 4.024 | 3.412 | 3.735 | 3.310 | 3.310 | 3.707 | 3.530 |
| TTL/AAG | 3.121 | 2.357 | 2.530 | 2.090 | 2.313 | 2.140 | 2.584 | 2.682 | 2.243 | 2.297 | 2.371 |
| (EFL+BFL)/AAG | 2.980 | 2.074 | 2.183 | 1.834 | 1.942 | 1.905 | 2.294 | 2.302 | 1.940 | 1.977 | 1.864 |
| TL/(T2+T4+T7) | 4.316 | 6.941 | 7.590 | 10.627 | 7.889 | 6.728 | 7.285 | 4.201 | 8.270 | 7.785 | 7.722 |
| ALT/(T2+G23+T3) | 3.005 | 3.198 | 2.689 | 2.816 | 2.463 | 2.330 | 2.853 | 2.120 | 2.394 | 2.353 | 2.767 |
| (ALT+BFL)/(T3+G34+T4) | 5.733 | 5.701 | 3.998 | 5.844 | 4.208 | 4.480 | 4.428 | 4.009 | 4.008 | 4.030 | 4.770 |
| (EFL+AAG)/(G45+G56+G67) | 5.094 | 3.537 | 3.622 | 3.372 | 3.477 | 3.523 | 3.766 | 3.722 | 3.363 | 3.568 | 3.331 |
| TTL/(G12+G23+G45) | 4.716 | 4.869 | 5.991 | 4.278 | 4.331 | 4.836 | 5.718 | 5.689 | 5.813 | 4.457 | 5.846 |
| (T4+T5+T6)/(T2+T3) | 1.937 | 2.282 | 1.714 | 2.987 | 1.755 | 1.603 | 1.873 | 1.040 | 1.338 | 1.636 | 1.813 |
| (T3+G34+T4)/T1 | 0.987 | 0.711 | 1.234 | 0.616 | 1.272 | 0.961 | 1.259 | 2.498 | 1.083 | 1.279 | 0.961 |
| (G23+G67)/(T2+T6) | 1.031 | 1.952 | 1.647 | 2.222 | 1.796 | 3.119 | 1.907 | 1.313 | 2.684 | 1.786 | 2.008 |
| (T6+T7)/(T3+T4) | 2.338 | 1.907 | 1.104 | 1.707 | 1.224 | 1.257 | 1.117 | 1.098 | 1.000 | 1.136 | 1.501 |
| TL/(G12+G23+G34) | 10.086 | 11.833 | 13.531 | 9.469 | 11.149 | 8.803 | 12.862 | 13.238 | 11.728 | 10.504 | 12.176 |
| TL/(G45+T5+G56) | 4.997 | 4.880 | 5.366 | 4.644 | 4.104 | 5.717 | 4.017 | 5.011 | 5.981 | 4.210 | 5.604 |
| (EFL+AAG)/(ALT+BFL) | 1.732 | 2.129 | 1.957 | 2.461 | 2.133 | 2.400 | 1.941 | 1.808 | 2.227 | 2.186 | 1.985 |
| (G23+T3+G34)/(T4+T5) | 1.814 | 1.507 | 1.464 | 1.499 | 1.582 | 1.946 | 1.103 | 1.497 | 1.995 | 1.683 | 1.620 |
| (G45+G56+G67)/(G12+G23+G34) | 2.584 | 4.452 | 4.776 | 3.888 | 4.136 | 3.469 | 4.441 | 4.468 | 4.659 | 3.873 | 4.465 |
| (T1+T2+G23)/(T5+G56) | 4.779 | 4.429 | 3.388 | 4.614 | 2.743 | 4.836 | 1.700 | 3.224 | 4.103 | 2.783 | 3.293 |
| TTL/(G23+G45) | 4.765 | 4.945 | 6.048 | 4.318 | 4.413 | 4.953 | 5.990 | 5.845 | 5.995 | 4.531 | 6.025 |

FIG. 51

OPTICAL IMAGING LENS

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or a personal digital assistant (PDA) for taking pictures or for recording videos.

2. Description of the Prior Art

In recent years, the optical imaging lens has been continuously evolving, and its application range becomes wider. In addition to requiring the lens to be thin, light and short, the design of small f-number (Fno) is conducive to improving luminous flux.

Therefore, in addition to pursuing the thinness and smallness of the optical imaging lens, it is also an important direction of research and development to design an optical imaging lens with small f-number.

SUMMARY OF THE INVENTION

In light of the above, the present invention proposes an optical imaging lens of seven lens elements which is shorter in system length, technically possible, has ensured imaging quality, and has smaller f-number and enhanced image definition. The optical imaging lens of seven lens elements of the present invention from an object side to an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward the object side to allow imaging rays to pass through as well as an image-side surface which faces toward the image side to allow the imaging rays to pass through.

In one embodiment of the present invention, a periphery region of the image-side surface of the first lens element is concave, a periphery region of the object-side surface of the third lens element is concave, a periphery region of the object-side surface of the fourth lens element is concave, the fifth lens element has negative refracting power, and a periphery region of the object-side surface of the fifth lens element is concave, an optical axis region of the image-side surface of the sixth lens element is concave, the lens elements having refracting power included by the optical imaging lens are only the seven lens elements described above, wherein the optical imaging lens satisfies the relationships: $(G45+T5+G56+T6+G67+T7)/(T1+G12+T2) \geq 3.200$, T1 is a thickness of the first lens element along the optical axis, T2 is a thickness of the second lens element along the optical axis, T5 is a thickness of the fifth lens element along the optical axis, T6 is a thickness of the sixth lens element along the optical axis, T7 is a thickness of the seventh lens element along the optical axis, G12 is an air gap between the first lens element and the second lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis.

In another embodiment of the present invention, an optical axis region of the object-side surface of the first lens element is convex, a periphery region of the image-side surface of the second lens element is concave, a periphery region of the object-side surface of the third lens element is concave, a periphery region of the object-side surface of the fourth lens element is concave, the fifth lens element has negative refracting power, and a periphery region of the object-side surface of the fifth lens element is concave, an optical axis region of the image-side surface of the sixth lens element is concave, the lens elements having refracting power included by the optical imaging lens are only the seven lens elements described above, wherein the optical imaging lens satisfies the relationships: $(G45+T5+G56+T6+G67+T7)/(T1+G12+T2) \geq 3.200$, T1 is a thickness of the first lens element along the optical axis, T2 is a thickness of the second lens element along the optical axis, T5 is a thickness of the fifth lens element along the optical axis, T6 is a thickness of the sixth lens element along the optical axis, T7 is a thickness of the seventh lens element along the optical axis, G12 is an air gap between the first lens element and the second lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis.

In the optical imaging lens of the present invention, the embodiments may also selectively satisfy the following optical conditions:

| | |
|---|---|
| $TTL/AAG \leq 3.200$; | 1. |
| $(EFL+BFL)/AAG \leq 3.000$; | 2. |
| $TL/(T2+T4+T7) \geq 4.200$; | 3. |
| $ALT/(T2+G23+T3) \leq 3.200$; | 4. |
| $(ALT+BFL)/(T3+G34+T4) \geq 4.000$; | 5. |
| $(EFL+AAG)/(G45+G56+G67) \leq 5.100$; | 6. |
| $TTL/(G12+G23+G45) \leq 7.000$; | 7. |
| $(T4+T5+T6)/(T2+T3) \leq 3.000$; | 8. |
| $(T3+G34+T4)/T1 \leq 2.500$; | 9. |
| $(G23+G67)/(T2+T6) \geq 1.000$; | 10. |
| $(T6+T7)/(T3+T4) \geq 1.000$; | 11. |
| $TL/(G12+G23+G34) \geq 8.800$; | 12. |
| $TL/(G45+T5+G56) \leq 6.000$; | 13. |
| $(EFL+AAG)/(ALT+BFL) \geq 1.700$; | 14. |
| $(G23+T3+G34)/(T4+T5) \geq 1.100$; | 15. |
| $(G45+G56+G67)/(G12+G23+G34) \geq 2.580$; | 16. |
| $(T1+T2+G23)/(T5+G56) \geq 1.700$; and | 17. |
| $TTL/(G23+G45) \leq 6.100$. | 18. |

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, T7 is a thickness of the seventh lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis, ALT is a sum of thicknesses of seven lens elements along the optical axis, TL is a distance from the object-side surface of the first lens element to the image-side surface of the seventh lens element along the optical axis, TTL is the distance from the object-side surface of the first lens element to an image plane along the optical axis, BFL is a distance from the image-side surface of the seventh lens element to an image plane along the optical axis, AAG is a sum of six air gaps from the first lens element to the seventh lens element along the optical axis, EFL is an effective focal length of the optical imaging lens.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 28 shows the optical data of the first example of the optical imaging lens.

FIG. 29 shows the aspheric surface data of the first example.

FIG. 30 shows the optical data of the second example of the optical imaging lens.

FIG. 31 shows the aspheric surface data of the second example.

FIG. 32 shows the optical data of the third example of the optical imaging lens.

FIG. 33 shows the aspheric surface data of the third example.

FIG. 34 shows the optical data of the fourth example of the optical imaging lens.

FIG. 35 shows the aspheric surface data of the fourth example.

FIG. 36 shows the optical data of the fifth example of the optical imaging lens.

FIG. 37 shows the aspheric surface data of the fifth example.

FIG. 38 shows the optical data of the sixth example of the optical imaging lens.

FIG. 39 shows the aspheric surface data of the sixth example.

FIG. 40 shows the optical data of the seventh example of the optical imaging lens.

FIG. 41 shows the aspheric surface data of the seventh example.

FIG. 42 shows the optical data of the eighth example of the optical imaging lens.

FIG. 43 shows the aspheric surface data of the eighth example.

FIG. 44 shows the optical data of the ninth example of the optical imaging lens.

FIG. 45 shows the aspheric surface data of the ninth example.

FIG. 46 shows the optical data of the tenth example of the optical imaging lens.

FIG. 47 shows the aspheric surface data of the tenth example.

FIG. 48 shows the optical data of the eleventh example of the optical imaging lens.

FIG. 49 shows the aspheric surface data of the eleventh example.

FIG. 50 shows some important ratios in the examples.

FIG. 51 shows some important ratios in the examples.

DETAILED DESCRIPTION

The terms "optical axis region", "periphery region", "concave", and "convex" used in this specification and claims should be interpreted based on the definition listed in the specification by the principle of lexicographer.

Figure 1:
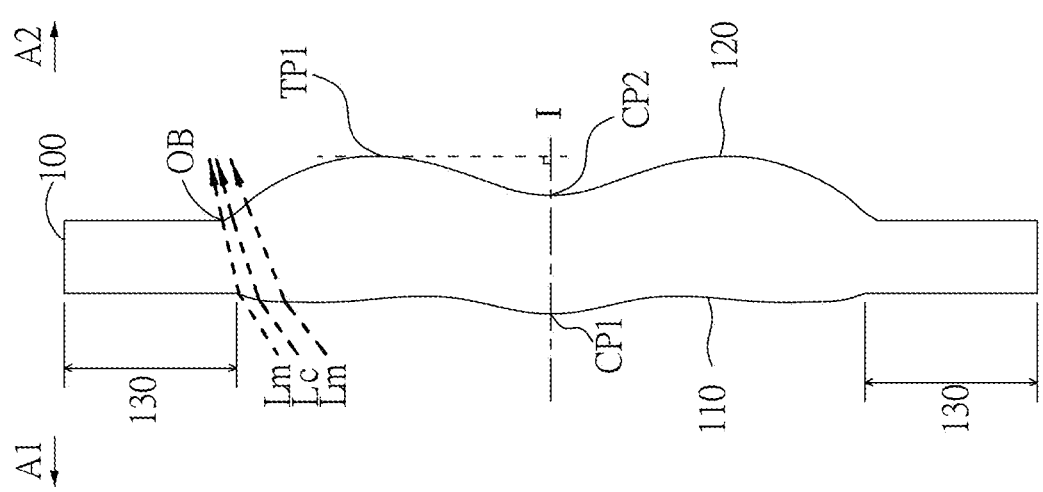

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
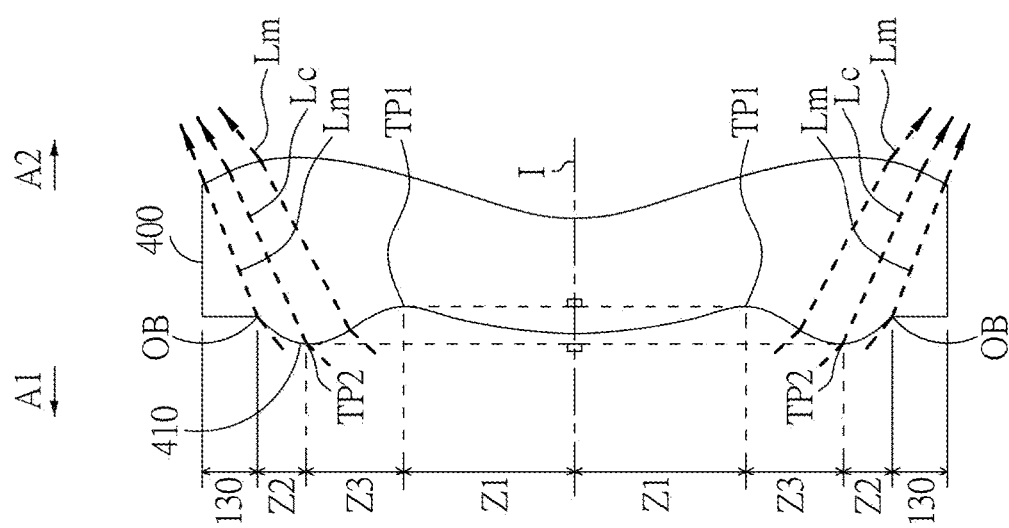

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
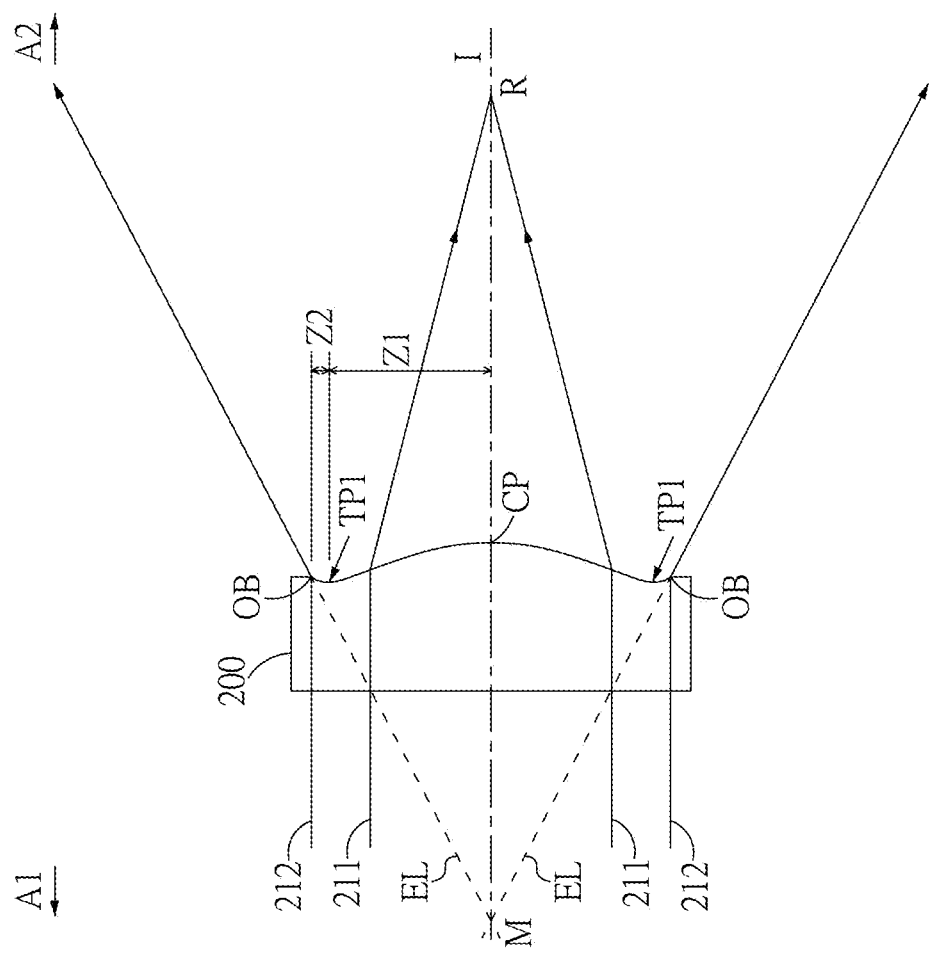
FIGS. 1-5 illustrates the methods for determining the surface shapes and for determining optical region or periphery region of one lens element.

Referring to FIG. 2, optical axis region Z1 is defined between central point CP and first transition point TP1.

Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
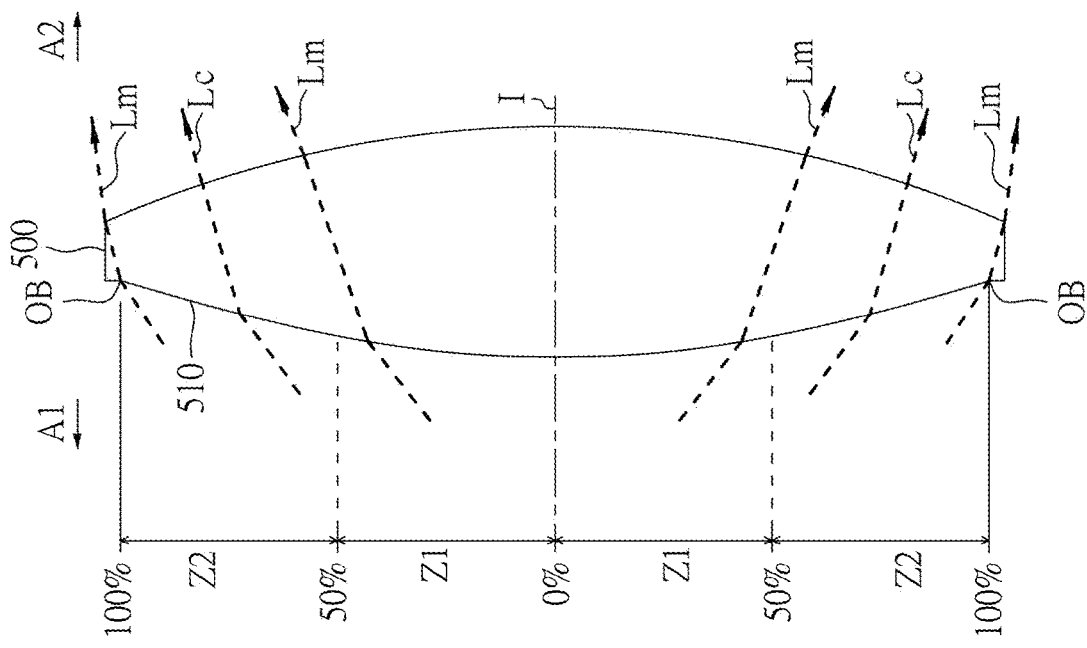
Figure 3:
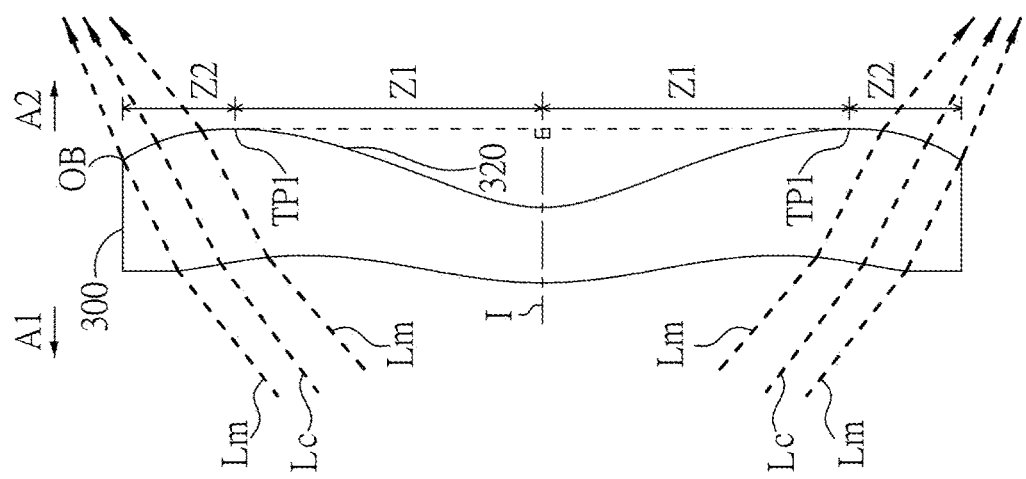

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R≥0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R≥0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R≥0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
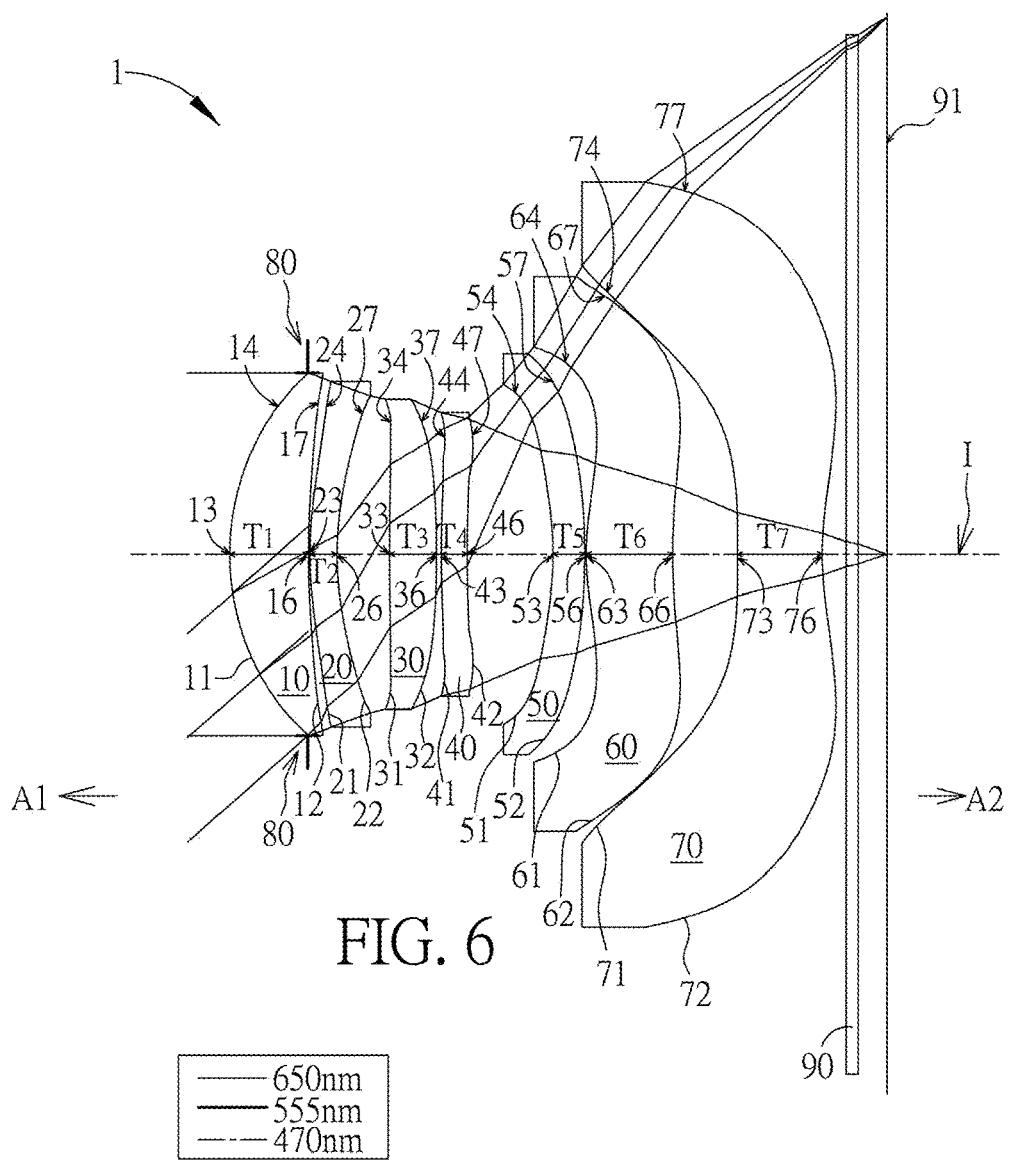
FIG. 6 illustrates a first example of the optical imaging lens of the present invention.

As shown in FIG. 6, the optical imaging lens 1 of seven lens elements of the present invention, sequentially located from an object side A1 (where an object is located) to an image side A2 along an optical axis I, has an aperture stop (ape. stop) 80, a first lens element 10, a second lens element 20, a third lens element 30, a fourth lens element 40, a fifth lens element 50, a sixth lens element 60, a seventh lens element 70, a filter 90 and an image plane 91. Generally speaking, the first lens element 10, the second lens element 20, the third lens element 30, the fourth lens element 40, the fifth lens element 50, the sixth lens element 60 and the seventh lens element 70 may be made of a transparent plastic material but the present invention is not limited to this, and each has an appropriate refracting power. In the present invention, lens elements having refracting power included by the optical imaging lens 1 are only the seven lens elements described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. In FIG. 6, the aperture stop 80 is disposed between the first lens element 10 and object side A1. When light emitted or reflected by an object (not shown) which is located at the object side A1 enters the optical imaging lens 1 of the present invention, it forms a clear and sharp image on the image plane 91 at the image side A2 after passing through the aperture stop 80, the first lens element 10, the second lens element 20, the third lens element 30, the fourth lens element 40, the fifth lens element 50, the sixth lens element 60, the seventh lens element 70 and the filter 90. In one embodiment of the present invention, the optional filter 90 may be a filter of various suitable functions, for example, the filter 90 may be an infrared cut filter (IR cut filter), placed between the seventh lens element 70 and the image plane 91.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; and the seventh lens element 70 has an object-side surface 71 and an image-side surface 72. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7. Therefore, the sum of thicknesses of seven lens elements in the optical imaging lens 1 along the optical axis I is ALT=T1+T2+T3+T4+T5+T6+T7.

In addition, between two adjacent lens elements in the optical imaging lens 1 of the present invention there may be an air gap along the optical axis I. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60 as well as an air gap G67 disposed between the sixth lens element 60 and the seventh lens element 70. Therefore, the sum of six air gaps from the first lens element 10 to the seventh lens element 70 along the optical axis I is AAG=G12+G23+G34+G45+G56+G67.

In addition, a distance from the object-side surface 11 of the first lens element 10 to the image plane 91 along the optical axis I is TTL, namely a system length of the optical imaging lens 1; an effective focal length of the optical imaging lens is EFL; a distance from the object-side surface 11 of the first lens element 10 to the image-side surface 72 of the seventh lens element 70 along the optical axis I is TL; HFOV stands for the half field of view which is half of the field of view of the entire optical imaging lens element system; ImgH is the image height of the optical imaging lens 1, and Fno is the f-number of the optical imaging lens 1.

When the filter 90 is placed between the seventh lens element 70 and the image plane 91, the air gap between the seventh lens element 70 and the filter 90 along the optical axis I is G7F; the thickness of the filter 90 along the optical axis I is TF; the air gap between the filter 90 and the image plane 91 along the optical axis I is GFP; and the distance from the image-side surface 72 of the seventh lens element 70 to the image plane 91 along the optical axis I is BFL. Therefore, BFL=G7F+TF+GFP.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the focal length of the seventh lens element 70 is f7; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the refractive index of the seventh lens element 70 is n7; the Abbe number of the first lens element 10 is $\upsilon 1$; the Abbe number of the second lens element 20 is $\upsilon 2$; the Abbe number of the third lens element 30 is $\upsilon 3$; and the Abbe number of the fourth lens element 40 is $\upsilon 4$; the Abbe number of the fifth lens element 50 is $\upsilon 5$; the Abbe number of the sixth lens element 60 is $\upsilon 6$; and the Abbe number of the seventh lens element 70 is $\upsilon 7$.

First Example

Figures 7A, 7B, 7C, 7D:
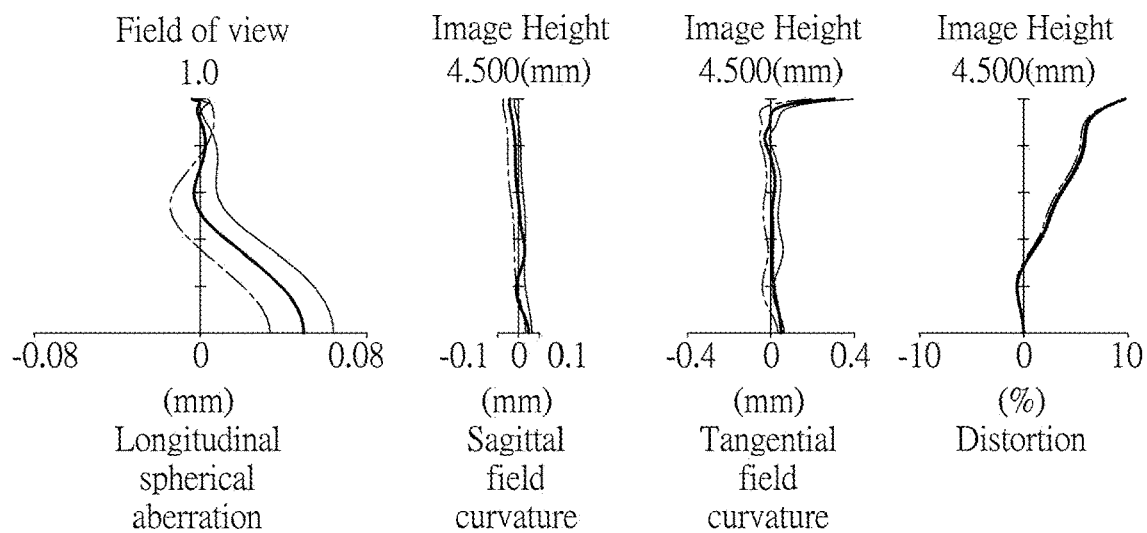
FIG. 7A illustrates the longitudinal spherical aberration on the image plane of the first example.
FIG. 7B illustrates the field curvature aberration on the sagittal direction of the first example.
FIG. 7C illustrates the field curvature aberration on the tangential direction of the first example.
FIG. 7D illustrates the distortion of the first example.

Please refer to FIG. 6 which illustrates the first example of the optical imaging lens 1 of the present invention. Please refer to FIG. 7A for the longitudinal spherical aberration on the image plane 91 of the first example; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each example is "field of view" for 1.0. The Y axis of the astigmatic field and the distortion in each example stands for "image height" (ImgH), which is 4.500 mm.

The optical imaging lens 1 of the first example exclusively has seven lens elements 10, 20, 30, 40, 50, 60 and 70 with refracting power. The optical imaging lens 1 also has an aperture stop 80. The aperture stop 80 is provided between the first lens element 10 and the object side A1.

The first lens element 10 has positive refracting power. An optical axis region 13 of the object-side surface 11 of the first lens element 10 is convex, and a periphery region 14 of the object-side surface 11 of the first lens element 10 is convex. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspherical surfaces, but it is not limited thereto.

The second lens element 20 has negative refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is concave, and a periphery region 27 of the image-side surface 22 of the second lens element 20 is concave. Besides, both the object-side surface 21 and the image-side surface 22 of the second lens element 20 are aspherical surfaces, but it is not limited thereto.

The third lens element 30 has positive refracting power. An optical axis region 33 of the object-side surface 31 of the third lens element 30 is convex, and a periphery region 34 of the object-side surface 31 of the third lens element 30 is concave. An optical axis region 36 of the image-side surface 32 of the third lens element 30 is convex, and a periphery region 37 of the image-side surface 32 of the third lens element 30 is convex. Besides, both the object-side surface 31 and the image-side surface 32 of the third lens element 30 are aspherical surfaces, but it is not limited thereto.

The fourth lens element 40 has negative refracting power. An optical axis region 43 of the object-side surface 41 of the fourth lens element 40 is convex, and a periphery region 44 of the object-side surface 41 of the fourth lens element 40 is concave. An optical axis region 46 of the image-side surface 42 of the fourth lens element 40 is concave, and a periphery region 47 of the image-side surface 42 of the fourth lens element 40 is convex. Besides, both the object-side surface 41 and the image-side surface 42 of the fourth lens element 40 are aspherical surfaces, but it is not limited thereto.

The fifth lens element 50 has negative refracting power. An optical axis region 53 of the object-side surface 51 of the fifth lens element 50 is concave, and a periphery region 54 of the object-side surface 51 of the fifth lens element 50 is concave. An optical axis region 56 of the image-side surface 52 of the fifth lens element 50 is convex, and a periphery region 57 of the image-side surface 52 of the fifth lens element 50 is convex. Besides, both the object-side surface 51 and the image-side surface 52 of the fifth lens element 50 are aspherical surfaces, but it is not limited thereto.

The sixth lens element 60 has positive refracting power. An optical axis region 63 of the object-side surface 61 of the sixth lens element 60 is convex, and a periphery region 64 of the object-side surface 61 of the sixth lens element 60 is concave. An optical axis region 66 of the image-side surface 62 of the sixth lens element 60 is concave, and a periphery region 67 of the image-side surface 62 of the sixth lens element 60 is convex. Besides, both the object-side surface 61 and the image-side surface 62 of the sixth lens element 60 are aspherical surfaces, but it is not limited thereto.

The seventh lens element 70 has negative refracting power. An optical axis region 73 of the object-side surface 71 of the seventh lens element 70 is concave, and a periphery region 74 of the object-side surface 71 of the seventh lens element 70 is concave. An optical axis region 76 of the image-side surface 72 of the seventh lens element 70 is concave, and a periphery region 77 of the image-side surface 72 of the seventh lens element 70 is convex. Besides, both the object-side surface 71 and the image-side surface 72 of the seventh lens element 70 are aspherical surfaces, but it is not limited thereto.

In the first lens element 10, the second lens element 20, the third lens element 30, the fourth lens element 40, the fifth lens element 50, the sixth lens element 60 and the seventh lens element 70 of the optical imaging lens element 1 of the present invention, there are 14 surfaces, such as the object-side surfaces 11/21/31/41/51/61/71 and the image-side surfaces 12/22/32/42/52/62/72. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant; and
$a_{2i}$ is the aspheric coefficient of the $2i^{th}$ order.

The optical data of the first example of the optical imaging lens 1 are shown in FIG. 28 while the aspheric surface data are shown in FIG. 29. In the present examples of the optical imaging lens, the f-number of the entire optical imaging lens element system is Fno, EFL is the effective focal length, HFOV stands for the half field of view which is half of the field of view of the entire optical imaging lens element system, and the unit for the curvature radius, the thickness and the focal length is in millimeters (mm). In this example, EFL=4.715 mm; HFOV=41.682 degrees; TTL=5.505 mm; Fno=1.550; ImgH=4.500 mm.

Second Example

Figure 8:
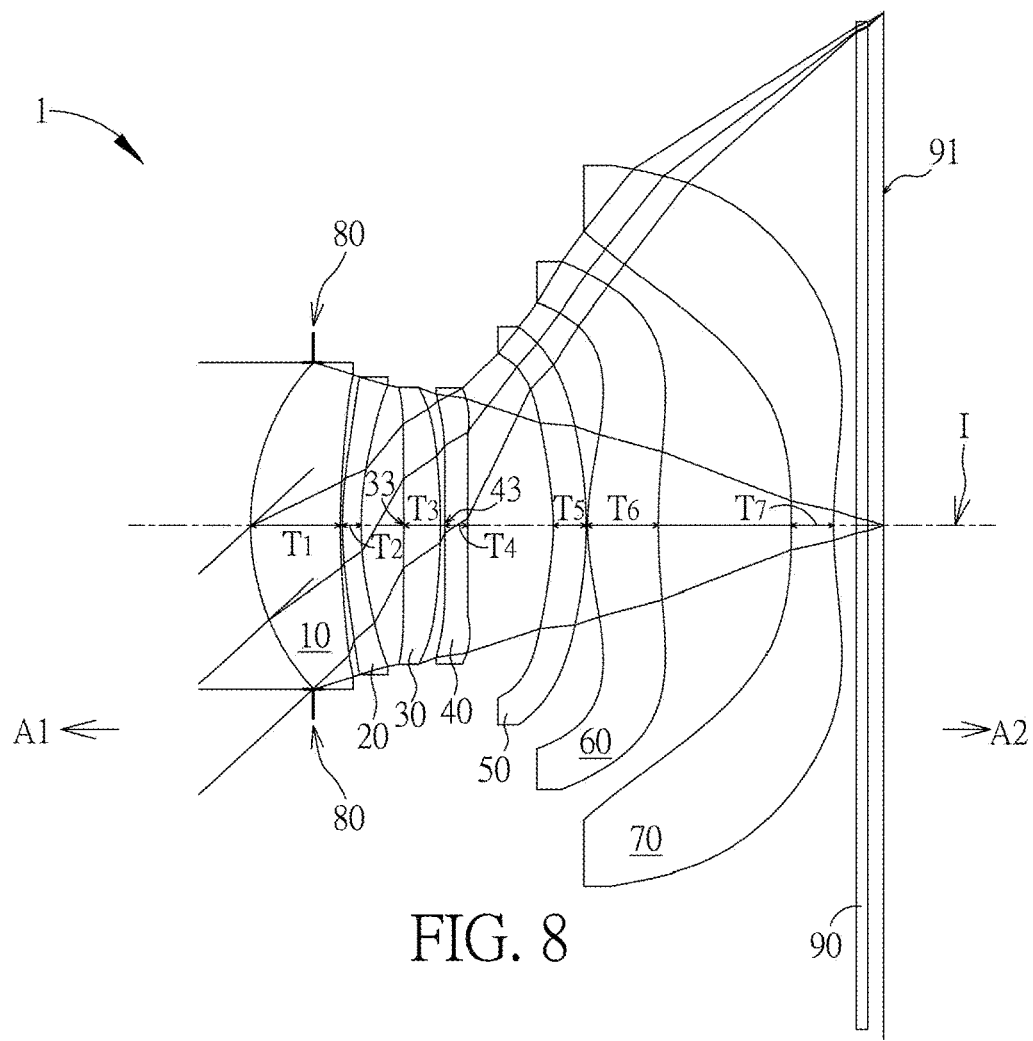
FIG. 8 illustrates a second example of the optical imaging lens of the present invention.
Figures 9A, 9B, 9C, 9D:
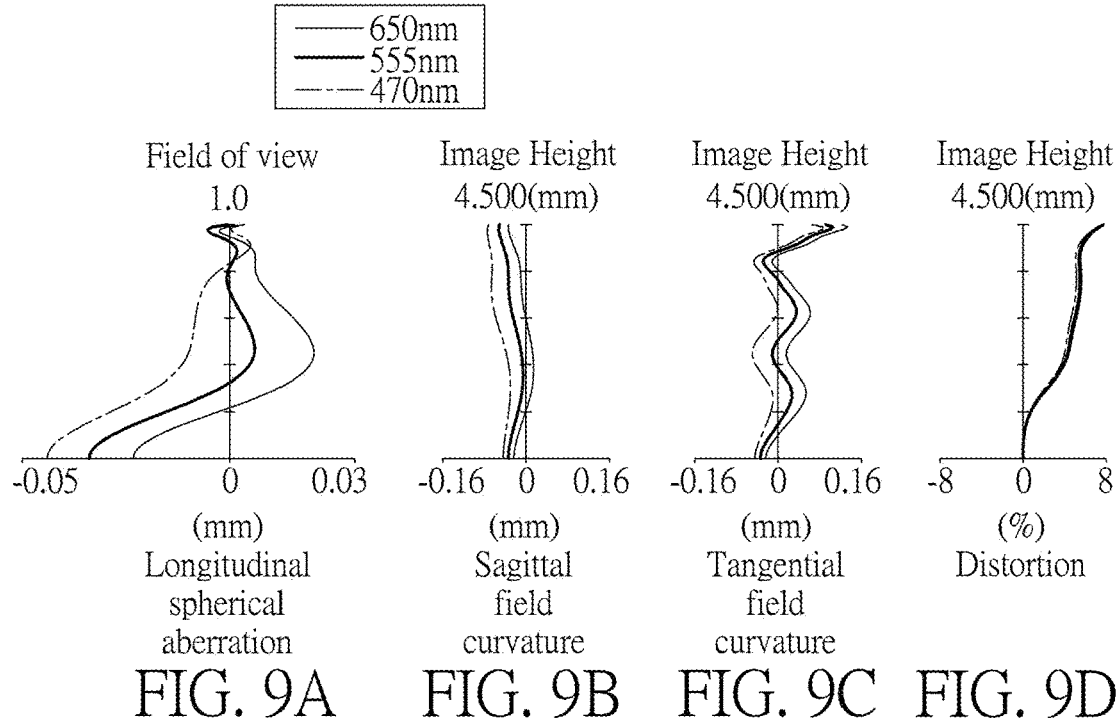
FIG. 9A illustrates the longitudinal spherical aberration on the image plane of the second example.
FIG. 9B illustrates the field curvature aberration on the sagittal direction of the second example.
FIG. 9C illustrates the field curvature aberration on the tangential direction of the second example.
FIG. 9D illustrates the distortion of the second example.

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the portion in a vicinity of the optical axis and the portion in a vicinity of its periphery will be omitted in the following examples. Please refer to FIG. 9A for the longitudinal spherical aberration on the image plane 91 of the second example, please refer to FIG. 9B for the field curvature aberration on the sagittal direction, please refer to FIG. 9C for the field curvature aberration on the tangential direction, and please refer to FIG. 9D for the distortion aberration. The components in this example are similar to those in the first example, but the optical data such as the curvature radius, the lens thickness, the aspheric surface or the back focal length in this example are different from the optical data in the first example. Besides, in this example, an optical axis region 33 of the object-side surface 31 of the third lens element 30 is concave, an optical axis region 43 of the object-side surface 41 of the fourth lens element 40 is concave.

The optical data of the second example of the optical imaging lens are shown in FIG. 30 while the aspheric surface data are shown in FIG. 31. In this example, EFL=4.459 mm; HFOV=42.781 degrees; TTL=5.565 mm; Fno=1.550; ImgH=4.500 mm. In particular: (1) The longitudinal spherical aberration in this example is smaller than the longitudinal spherical aberration in the first example; (2) The field curvature aberration on the sagittal direction in this example is smaller than the field curvature aberration on the sagittal direction in the first example; (3) The field curvature aberration on the tangential direction in this example is smaller than the field curvature aberration on the tangential direction in the first example; (4) The distortion aberration in this example is smaller than the distortion aberration in the first example; (5) The HFOV in this example is larger than the HFOV in the first example.

Third Example

Figure 10:
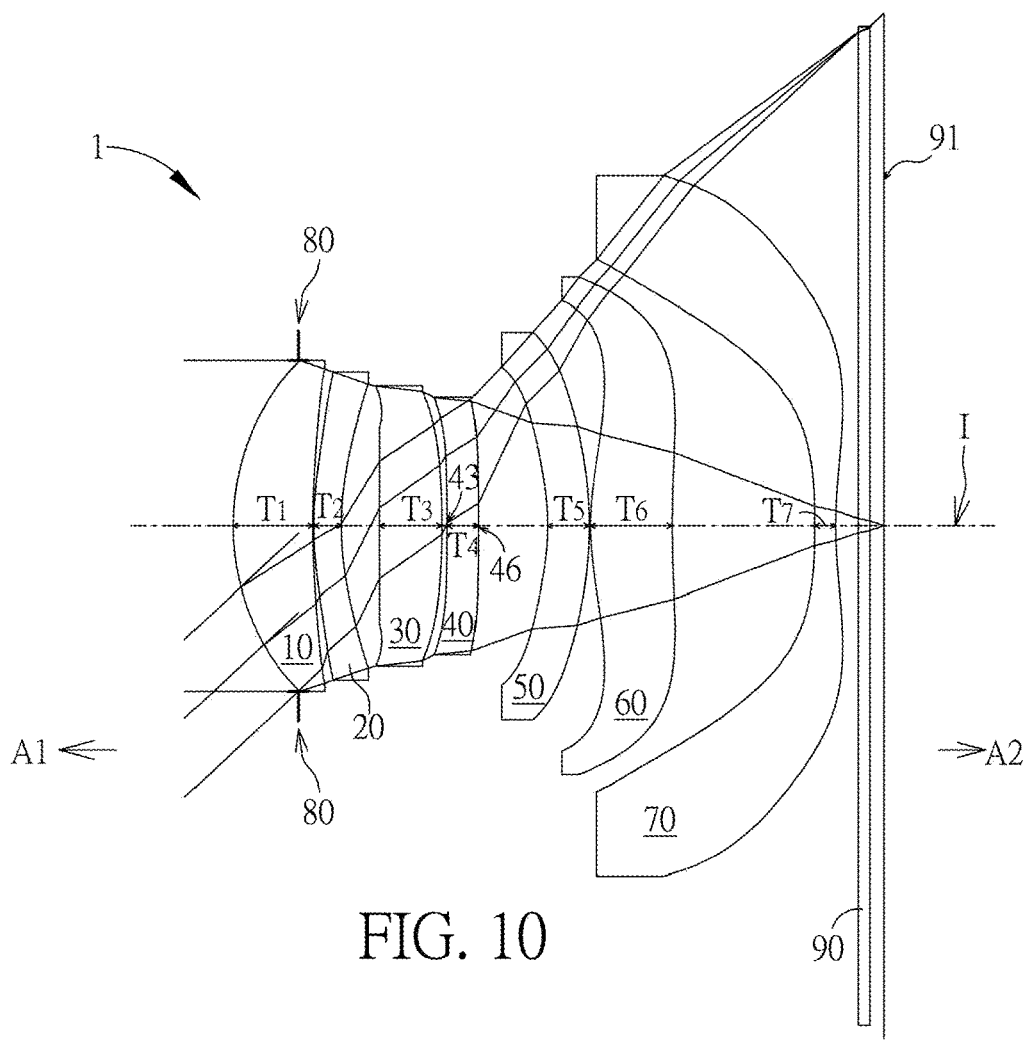
FIG. 10 illustrates a third example of the optical imaging lens of the present invention.
Figures 11A, 11B, 11C, 11D:
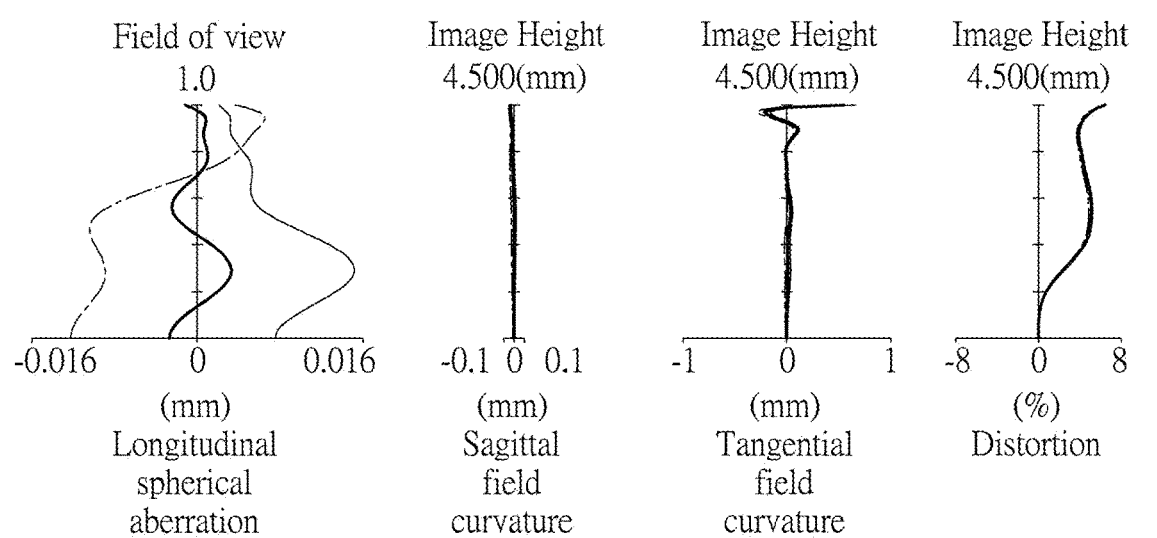
FIG. 11A illustrates the longitudinal spherical aberration on the image plane of the third example.
FIG. 11B illustrates the field curvature aberration on the sagittal direction of the third example.
FIG. 11C illustrates the field curvature aberration on the tangential direction of the third example.
FIG. 11D illustrates the distortion of the third example.

Please refer to FIG. 10 which illustrates the third example of the optical imaging lens 1 of the present invention. Please refer to FIG. 11A for the longitudinal spherical aberration on the image plane 91 of the third example; please refer to FIG. 11B for the field curvature aberration on the sagittal direction; please refer to FIG. 11C for the field curvature aberration on the tangential direction; and please refer to FIG. 11D for the distortion aberration. The components in this example are similar to those in the first example, but the optical data such as the curvature radius, the lens thickness, the aspheric surface or the back focal length in this example are different from the optical data in the first example. Besides, in this example, an optical axis region 43 of the object-side surface 41 of the fourth lens element 40 is concave, an optical axis region 46 of the image-side surface 42 of the fourth lens element 40 is convex.

The optical data of the third example of the optical imaging lens are shown in FIG. 32 while the aspheric surface data are shown in FIG. 33. In this example, EFL=4.523 mm; HFOV=43.004 degrees; TTL=5.737 mm; Fno=1.550; ImgH=4.500 mm. In particular: (1) The longitudinal spherical aberration in this example is smaller than the longitudinal spherical aberration in the first example; (2) The distortion aberration in this example is smaller than the distortion aberration in the first example; (3) The HFOV in this example is larger than the HFOV in the first example.

Fourth Example

Figure 12:
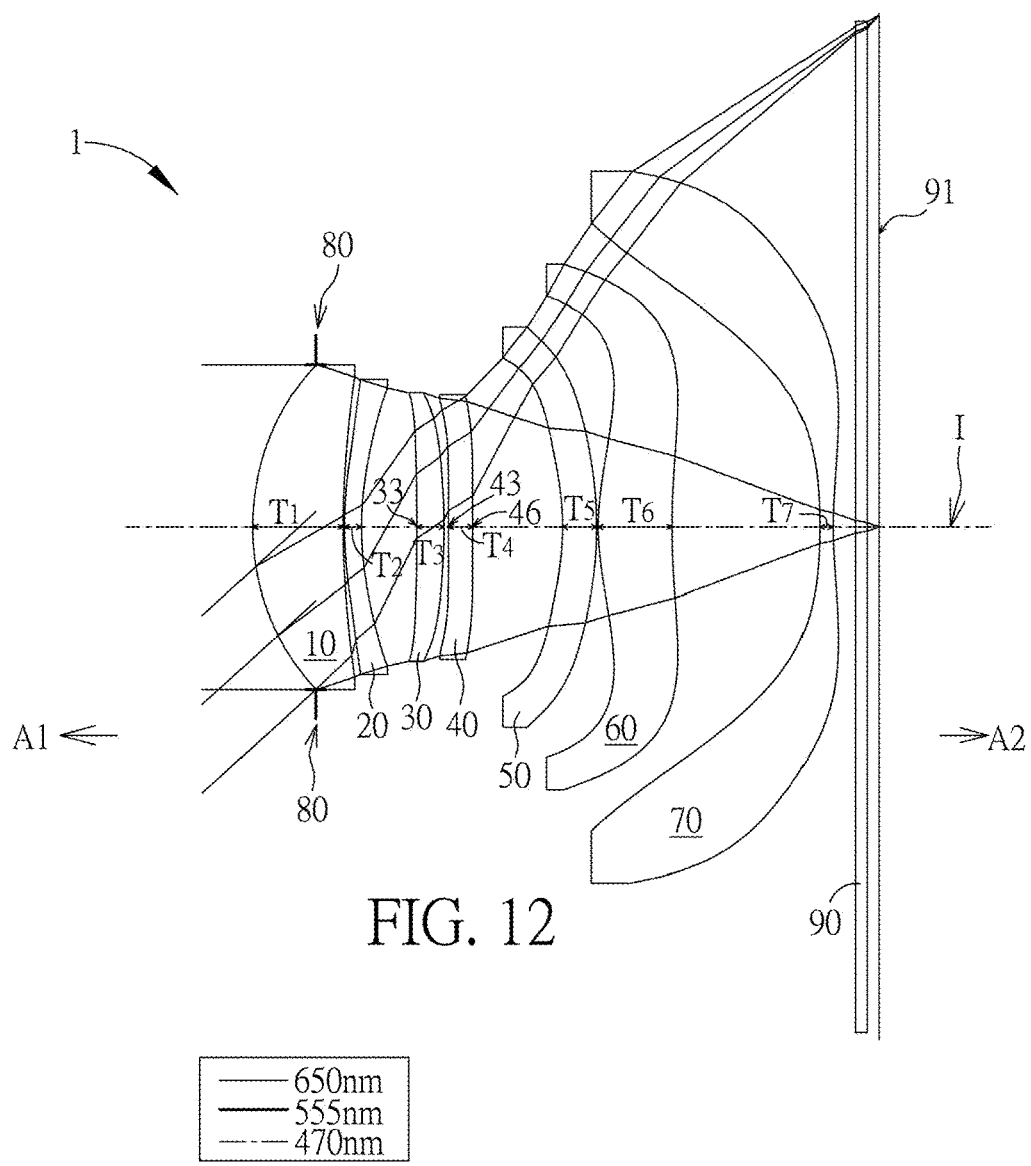
FIG. 12 illustrates a fourth example of the optical imaging lens of the present invention.
Figures 13A, 13B, 13C, 13D:
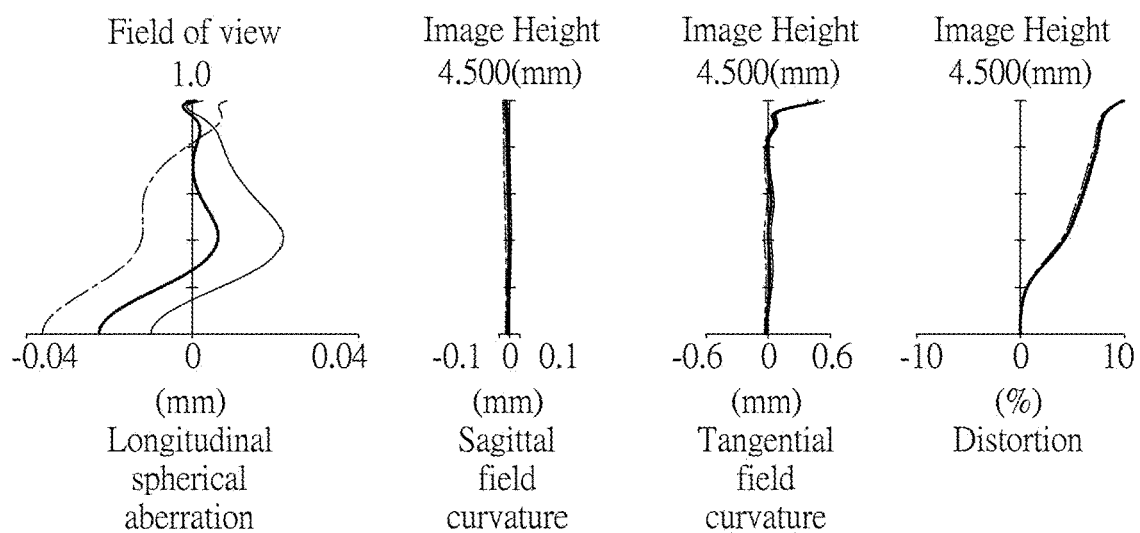
FIG. 13A illustrates the longitudinal spherical aberration on the image plane of the fourth example.
FIG. 13B illustrates the field curvature aberration on the sagittal direction of the fourth example.
FIG. 13C illustrates the field curvature aberration on the tangential direction of the fourth example.
FIG. 13D illustrates the distortion of the fourth example.

Please refer to FIG. 12 which illustrates the fourth example of the optical imaging lens 1 of the present invention. Please refer to FIG. 13A for the longitudinal spherical aberration on the image plane 91 of the fourth example; please refer to FIG. 13B for the field curvature aberration on the sagittal direction; please refer to FIG. 13C for the field curvature aberration on the tangential direction; and please refer to FIG. 13D for the distortion aberration. The components in this example are similar to those in the first example, but the optical data such as the curvature radius, the lens thickness, the aspheric surface or the back focal length in this example are different from the optical data in the first example. Besides, in this example, an optical axis region 33 of the object-side surface 31 of the third lens element 30 is concave, an optical axis region 43 of the object-side surface 41 of the fourth lens element 40 is concave, an optical axis region 46 of the image-side surface 42 of the fourth lens element 40 is convex.

The optical data of the fourth example of the optical imaging lens are shown in FIG. 34 while the aspheric surface data are shown in FIG. 35. In this example, EFL=4.452 mm; HFOV=42.491 degrees; TTL=5.532 mm; Fno=1.550; ImgH=4.500 mm. In particular: (1) The longitudinal spherical aberration in this example is smaller than the longitudinal spherical aberration in the first example; (2) The HFOV in this example is larger than the HFOV in the first example.

Fifth Example

Figure 14:
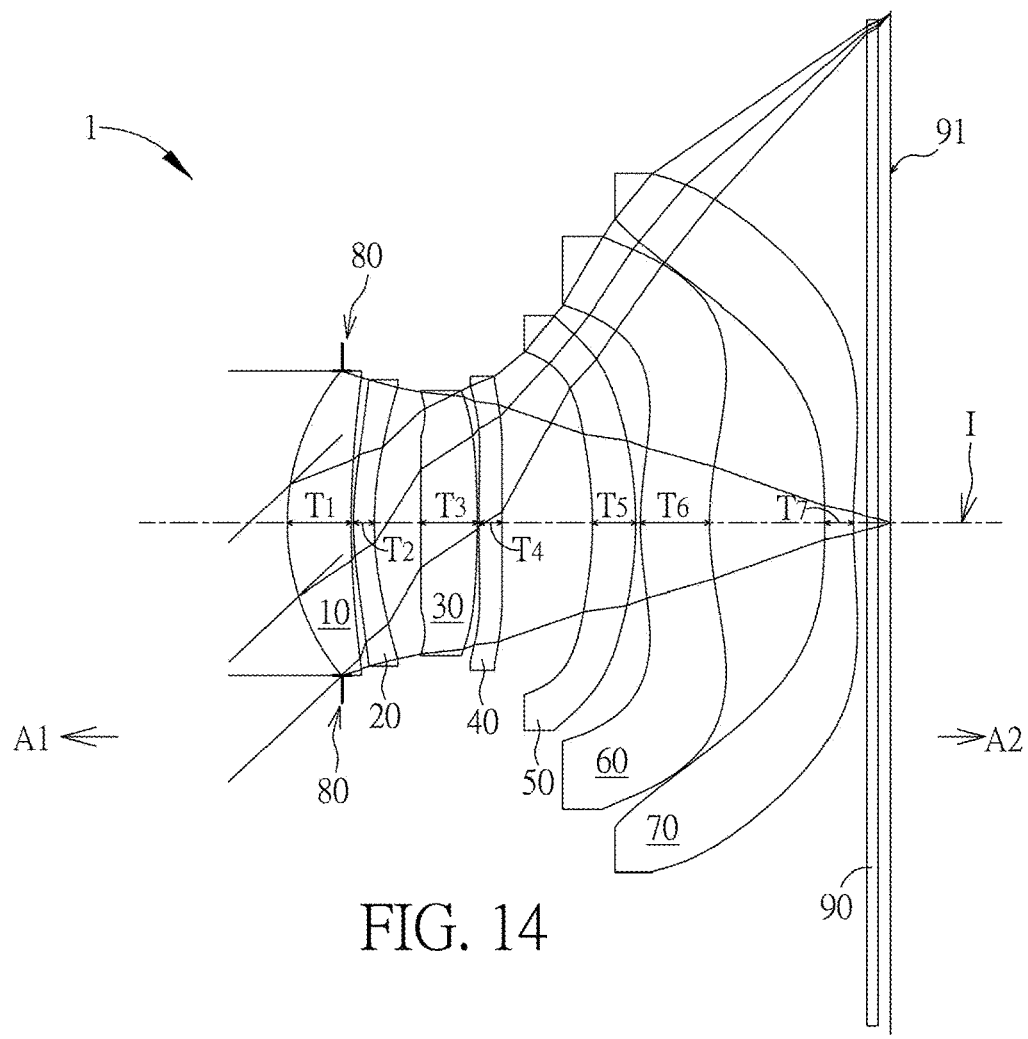
FIG. 14 illustrates a fifth example of the optical imaging lens of the present invention.
Figures 15A, 15B, 15C, 15D:
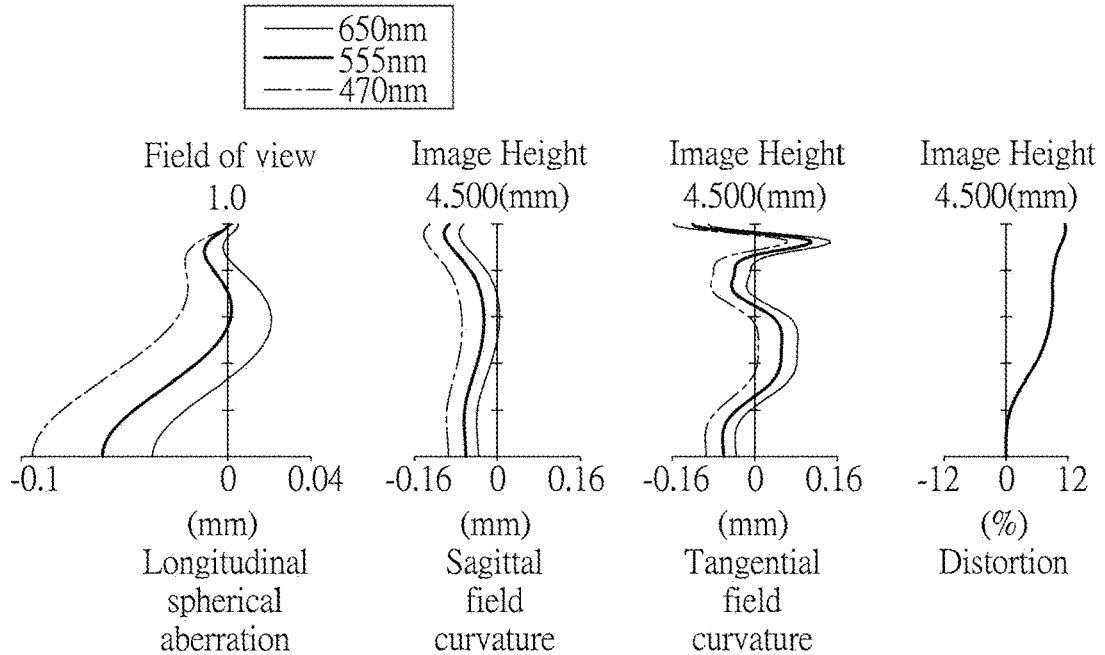
FIG. 15A illustrates the longitudinal spherical aberration on the image plane of the fifth example.
FIG. 15B illustrates the field curvature aberration on the sagittal direction of the fifth example.
FIG. 15C illustrates the field curvature aberration on the tangential direction of the fifth example.
FIG. 15D illustrates the distortion of the fifth example.

Please refer to FIG. 14 which illustrates the fifth example of the optical imaging lens 1 of the present invention. Please refer to FIG. 15A for the longitudinal spherical aberration on the image plane 91 of the fifth example; please refer to FIG. 15B for the field curvature aberration on the sagittal direction; please refer to FIG. 15C for the field curvature aberration on the tangential direction, and please refer to FIG. 15D for the distortion aberration. The components in this example are similar to those in the first example, but the optical data such as the curvature radius, the lens thickness, the aspheric surface or the back focal length in this example are different from the optical data in the first example. Besides, in this example, the fourth lens element 40 has positive refracting power.

The optical data of the fifth example of the optical imaging lens are shown in FIG. 36 while the aspheric surface data are shown in FIG. 37. In this example, EFL=4.152 mm; HFOV=43.507 degrees; TTL=5.334 mm; Fno=1.550; ImgH=4.500 mm. In particular: (1) The field curvature aberration on the tangential direction in this example is smaller than the field curvature aberration on the tangential direction in the first example; (2) The HFOV in this example is larger than the HFOV in the first example; (3) The system length of the optical imaging lens TTL in this example is shorter than the system length of the optical imaging lens TTL in the first example.

Sixth Example

Figure 16:
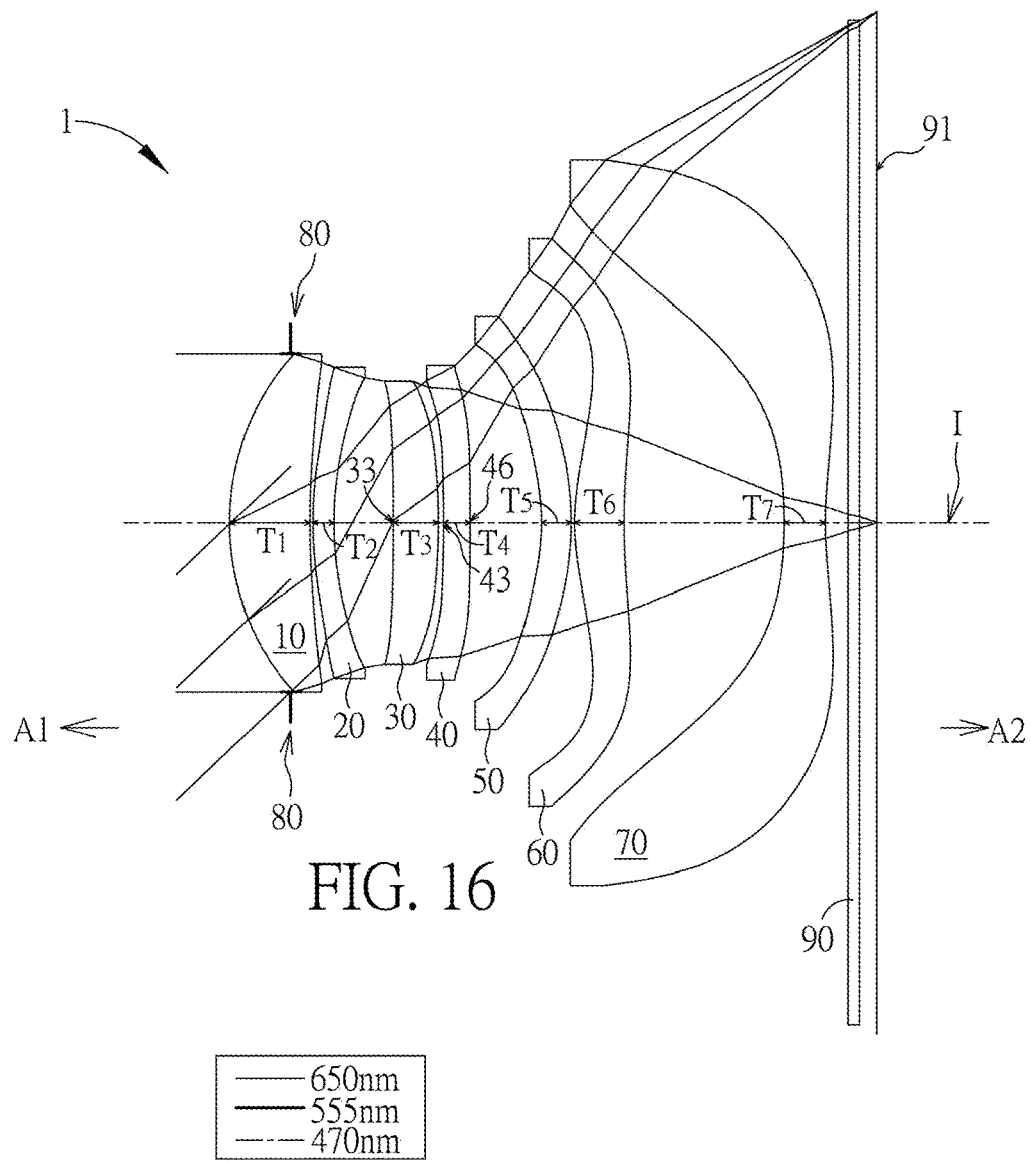
FIG. 16 illustrates a sixth example of the optical imaging lens of the present invention.
Figure 17A:
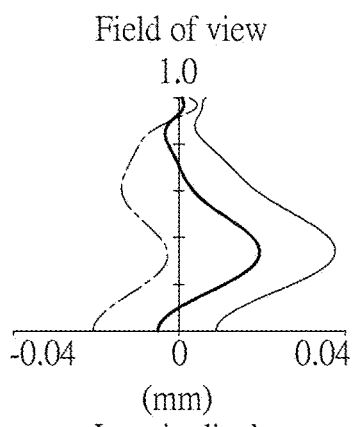
FIG. 17A illustrates the longitudinal spherical aberration on the image plane of the sixth example.
Figure 17B:
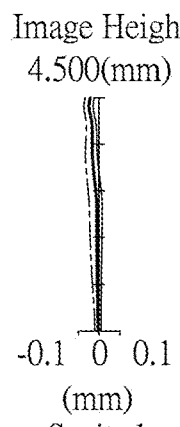
FIG. 17B illustrates the field curvature aberration on the sagittal direction of the sixth example.
Figure 17C:
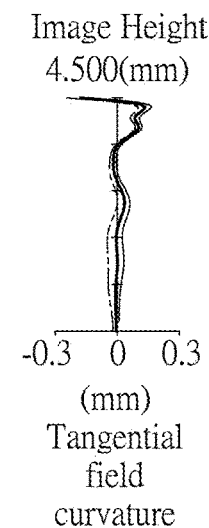
FIG. 17C illustrates the field curvature aberration on the tangential direction of the sixth example.
Figure 17D:
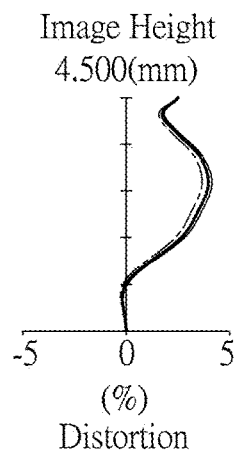
FIG. 17D illustrates the distortion of the sixth example.

Please refer to FIG. 16 which illustrates the sixth example of the optical imaging lens 1 of the present invention. Please refer to FIG. 17A for the longitudinal spherical aberration on the image plane 91 of the sixth example; please refer to FIG. 17B for the field curvature aberration on the sagittal direction; please refer to FIG. 17C for the field curvature aberration on the tangential direction, and please refer to FIG. 17D for the distortion aberration. The components in this example are similar to those in the first example, but the optical data such as the curvature radius, the lens thickness, the aspheric surface or the back focal length in this example are different from the optical data in the first example. Besides, in this example, an optical axis region 33 of the object-side surface 31 of the third lens element 30 is concave, an optical axis region 43 of the object-side surface 41 of the fourth lens element 40 is concave, an optical axis region 46 of the image-side surface 42 of the fourth lens element 40 is convex.

The optical data of the sixth example of the optical imaging lens are shown in FIG. 38 while the aspheric surface data are shown in FIG. 39. In this example, EFL=4.604 mm; HFOV=43.611 degrees; TTL=5.678 mm; Fno=1.550; ImgH=4.500 mm. In particular: (1) The longitudinal spherical aberration in this example is smaller than the longitudinal spherical aberration in the first example; (2) The field curvature aberration on the tangential direction in this example is smaller than the field curvature aberration on the tangential direction in the first example; (3) The distortion aberration in this example is smaller than the distortion aberration in the first example; (4) The HFOV in this example is larger than the HFOV in the first example.

Seventh Example

Figure 18:
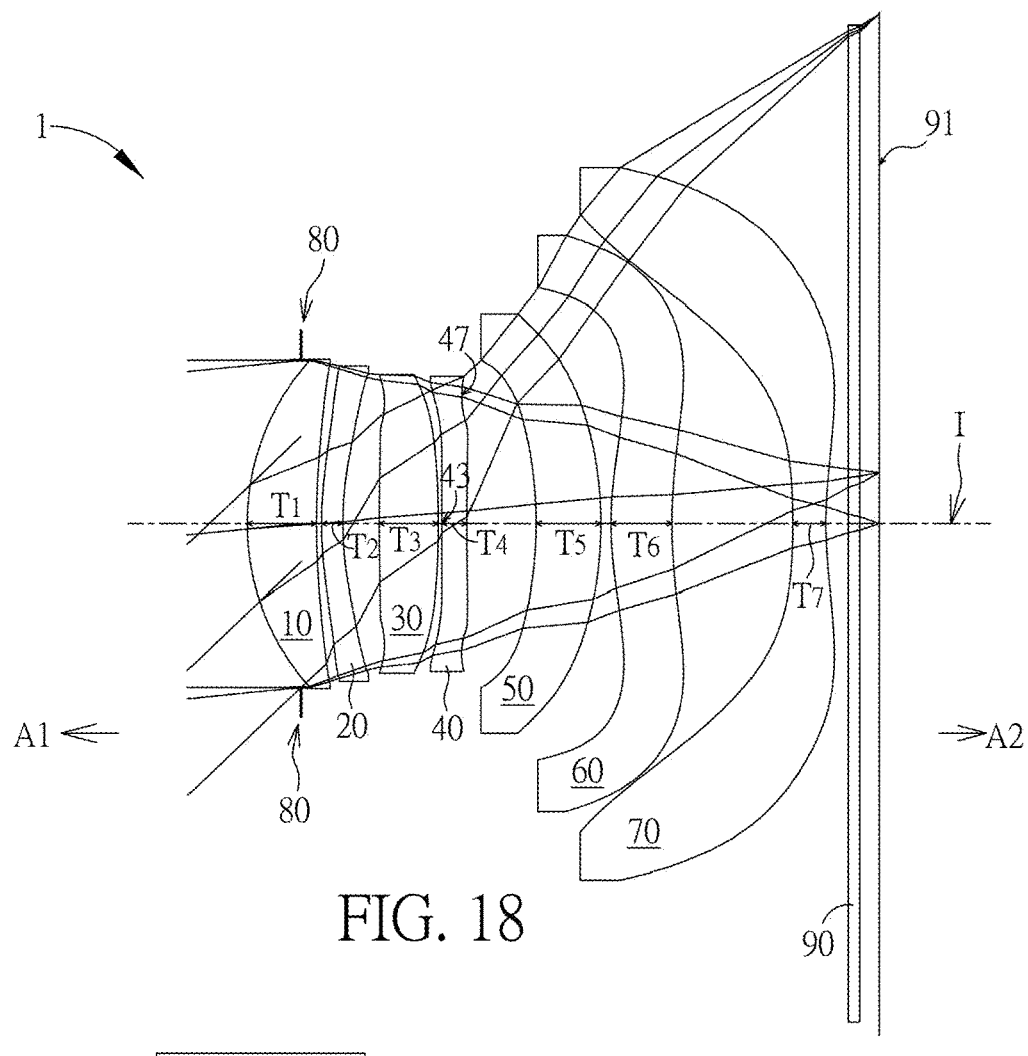
FIG. 18 illustrates a seventh example of the optical imaging lens of the present invention.
Figures 19A, 19B, 19C, 19D:
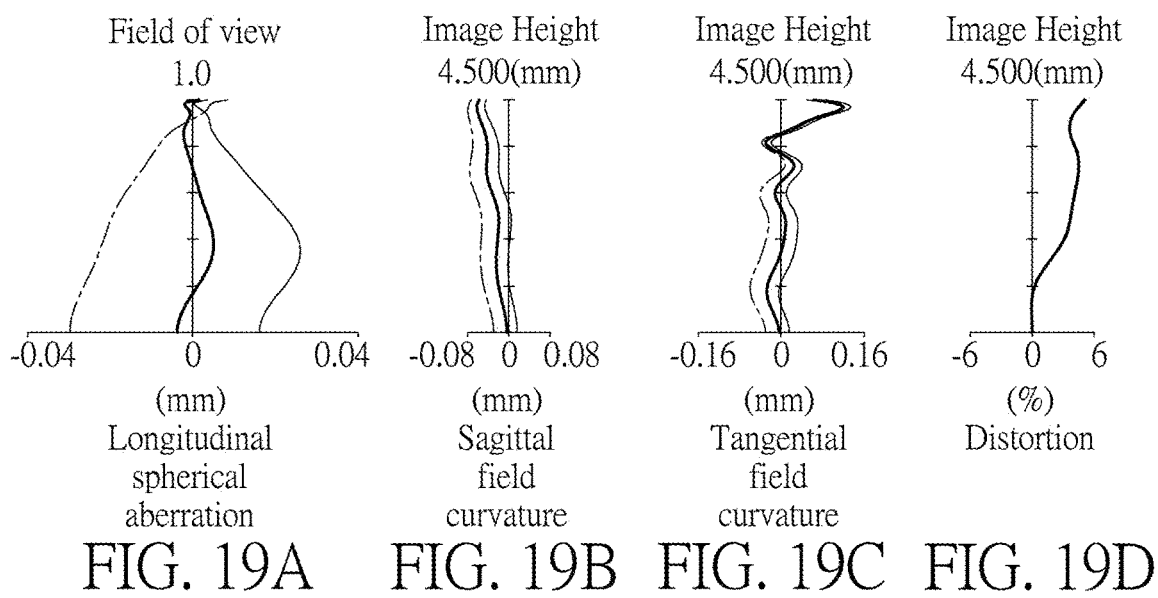
FIG. 19A illustrates the longitudinal spherical aberration on the image plane of the seventh example.
FIG. 19B illustrates the field curvature aberration on the sagittal direction of the seventh example.
FIG. 19C illustrates the field curvature aberration on the tangential direction of the seventh example.
FIG. 19D illustrates the distortion of the seventh example.

Please refer to FIG. 18 which illustrates the seventh example of the optical imaging lens 1 of the present invention. Please refer to FIG. 19A for the longitudinal spherical aberration on the image plane 91 of the seventh example; please refer to FIG. 19B for the field curvature aberration on the sagittal direction; please refer to FIG. 19C for the field curvature aberration on the tangential direction, and please refer to FIG. 19D for the distortion aberration. The components in this example are similar to those in the first example, but the optical data such as the curvature radius, the lens thickness, the aspheric surface or the back focal length in this example are different from the optical data in the first example. Besides, in this example, an optical axis region 43 of the object-side surface 41 of the fourth lens element 40 is concave, a periphery region 47 of the image-side surface 42 of the fourth lens element 40 is concave.

The optical data of the seventh example of the optical imaging lens are shown in FIG. 40 while the aspheric surface data are shown in FIG. 41. In this example, EFL=4.481 mm; HFOV=43.702 degrees; TTL=5.584 mm; Fno=1.550; ImgH=4.500 mm. In particular: (1) The longitudinal spherical aberration in this example is smaller than the longitudinal spherical aberration in the first example; (2) The field curvature aberration on the tangential direction in this example is smaller than the field curvature aberration on the tangential direction in the first example; (3) The distortion aberration in this example is smaller than the distortion aberration in the first example; (4) The HFOV in this example is larger than the HFOV in the first example.

Eighth Example

Figure 20:
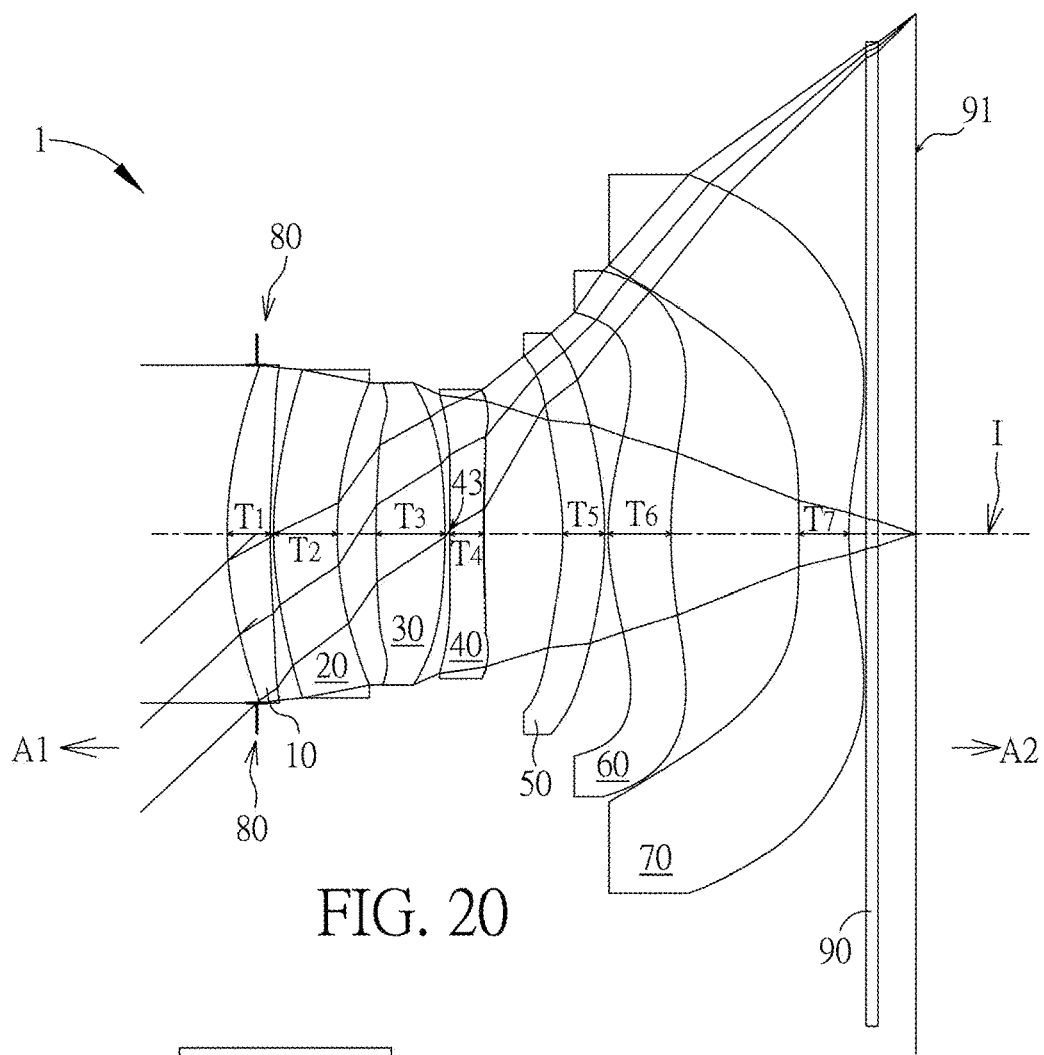
FIG. 20 illustrates an eighth example of the optical imaging lens of the present invention.
Figure 21A:
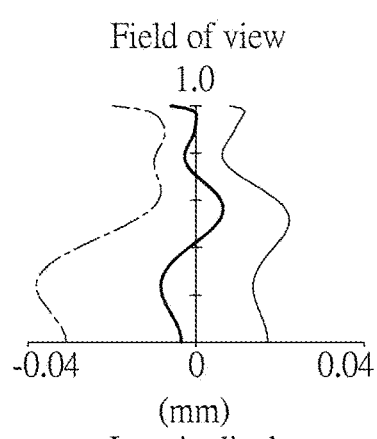
FIG. 21A illustrates the longitudinal spherical aberration on the image plane of the eighth example.
Figure 21B:
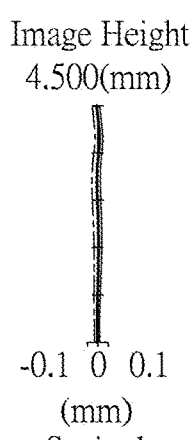
FIG. 21B illustrates the field curvature aberration on the sagittal direction of the eighth example.
Figure 21C:
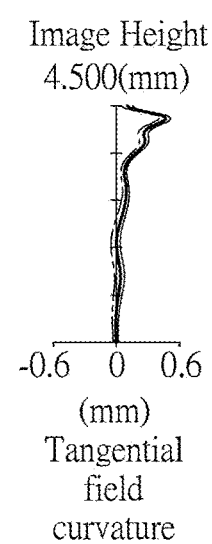
FIG. 21C illustrates the field curvature aberration on the tangential direction of the eighth example.
Figure 21D:
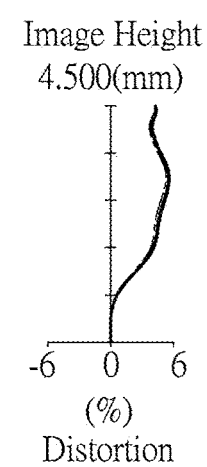
FIG. 21D illustrates the distortion of the eighth example.

Please refer to FIG. 20 which illustrates the eighth example of the optical imaging lens 1 of the present invention. Please refer to FIG. 21A for the longitudinal spherical aberration on the image plane 91 of the eighth example; please refer to FIG. 21B for the field curvature aberration on the sagittal direction; please refer to FIG. 21C for the field curvature aberration on the tangential direction, and please refer to FIG. 21D for the distortion aberration. The components in this example are similar to those in the first example, but the optical data such as the curvature radius, the lens thickness, the aspheric surface or the back focal length in this example are different from the optical data in the first example. Besides, in this example, the second lens element 20 has positive refracting power, an optical axis region 43 of the object-side surface 41 of the fourth lens element 40 is concave.

The optical data of the eighth example of the optical imaging lens are shown in FIG. 50 while the aspheric surface data are shown in FIG. 51. In this example, EFL=4.540 mm; HFOV=43.517 degrees; TTL=5.966 mm; Fno=1.550; ImgH=4.500 mm. In particular: (1) The longitudinal spherical aberration in this example is smaller than the longitudinal spherical aberration in the first example; (2) The field curvature aberration on the sagittal direction in this example is smaller than the field curvature aberration on the sagittal direction in the first example; (3) The distortion aberration in this example is smaller than the distortion aberration in the first example; (4) The HFOV in this example is larger than the HFOV in the first example.

Ninth Example

Figure 22:
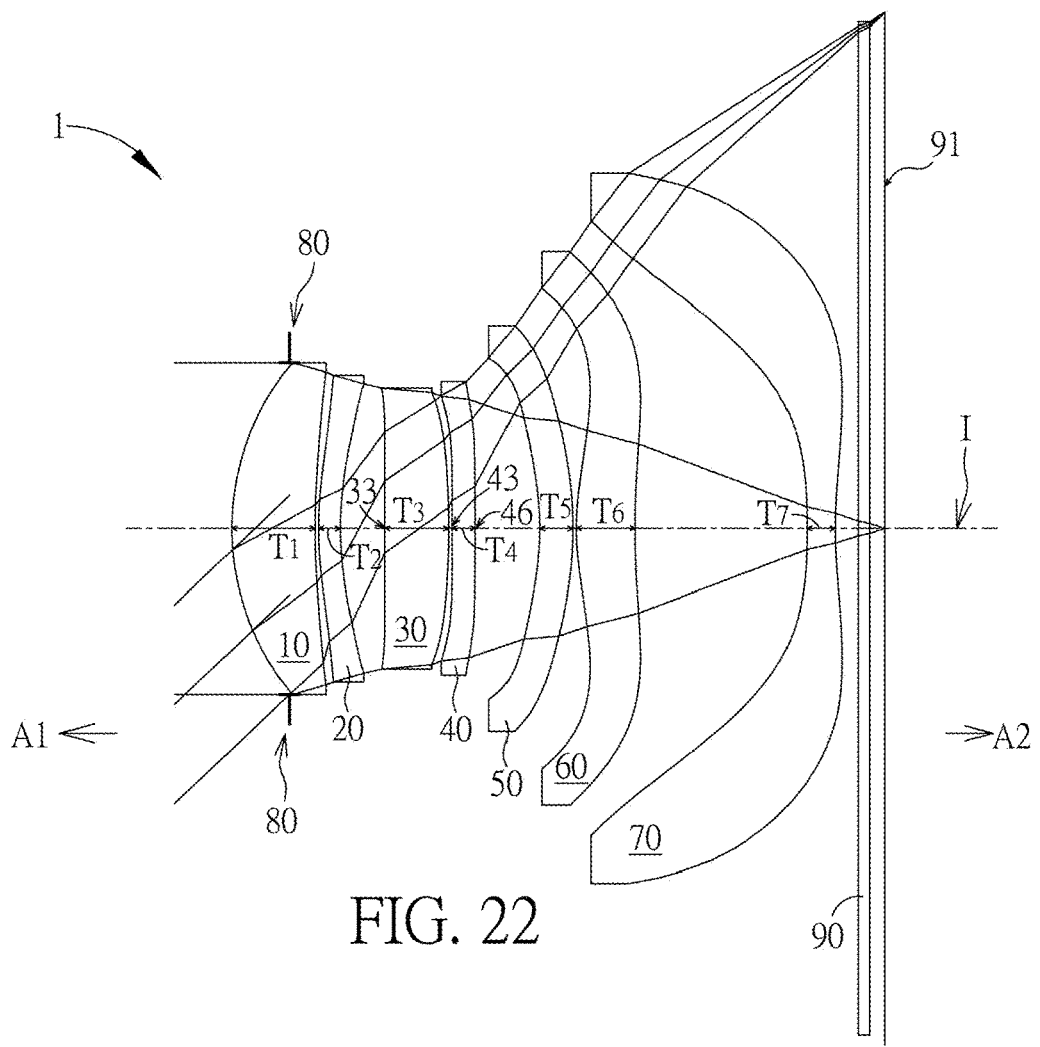
FIG. 22 illustrates a ninth example of the optical imaging lens of the present invention.
Figure 23A:
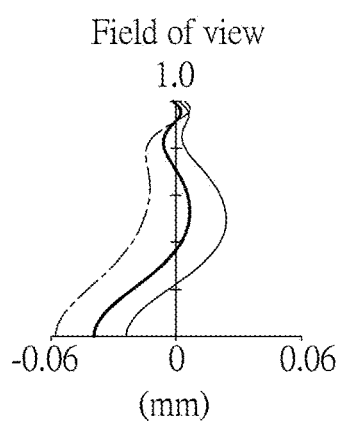
FIG. 23A illustrates the longitudinal spherical aberration on the image plane of the ninth example.
Figure 23B:
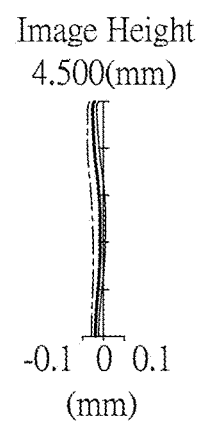
FIG. 23B illustrates the field curvature aberration on the sagittal direction of the ninth example.
Figure 23C:
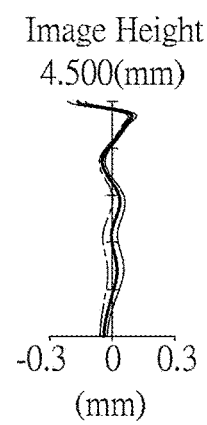
FIG. 23C illustrates the field curvature aberration on the tangential direction of the ninth example.
Figure 23D:
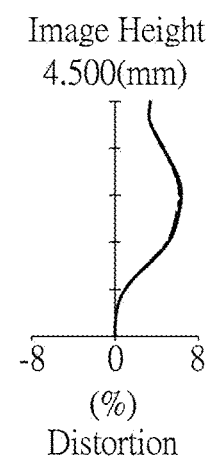
FIG. 23D illustrates the distortion of the ninth example.

Please refer to FIG. 22 which illustrates the ninth example of the optical imaging lens 1 of the present invention. Please refer to FIG. 23A for the longitudinal spherical aberration on the image plane 91 of the ninth example; please refer to FIG. 23B for the field curvature aberration on the sagittal direction; please refer to FIG. 23C for the field curvature aberration on the tangential direction, and please refer to FIG. 23D for the distortion aberration. The components in this example are similar to those in the first example, but the optical data such as the curvature radius, the lens thickness, the aspheric surface or the back focal length in this example are different from the optical data in the first example. Besides, in this example, an optical axis region 33 of the object-side surface 31 of the third lens element 30 is concave, an optical axis region 43 of the object-side surface 41 of the fourth lens element 40 is concave, an optical axis region 46 of the image-side surface 42 of the fourth lens element 40 is convex.

The optical data of the ninth example of the optical imaging lens are shown in FIG. 44 while the aspheric surface data are shown in FIG. 45. In this example, EFL=4.489 mm; HFOV=43.690 degrees; TTL=5.694 mm; Fno=1.550; ImgH=4.500 mm. In particular: (1) The longitudinal spherical aberration in this example is smaller than the longitudinal spherical aberration in the first example; (2) The field curvature aberration on the tangential direction in this example is smaller than the field curvature aberration on the tangential direction in the first example; (3) The distortion aberration in this example is smaller than the distortion aberration in the first example; (4) The HFOV in this example is larger than the HFOV in the first example.

Tenth Example

Figure 24:
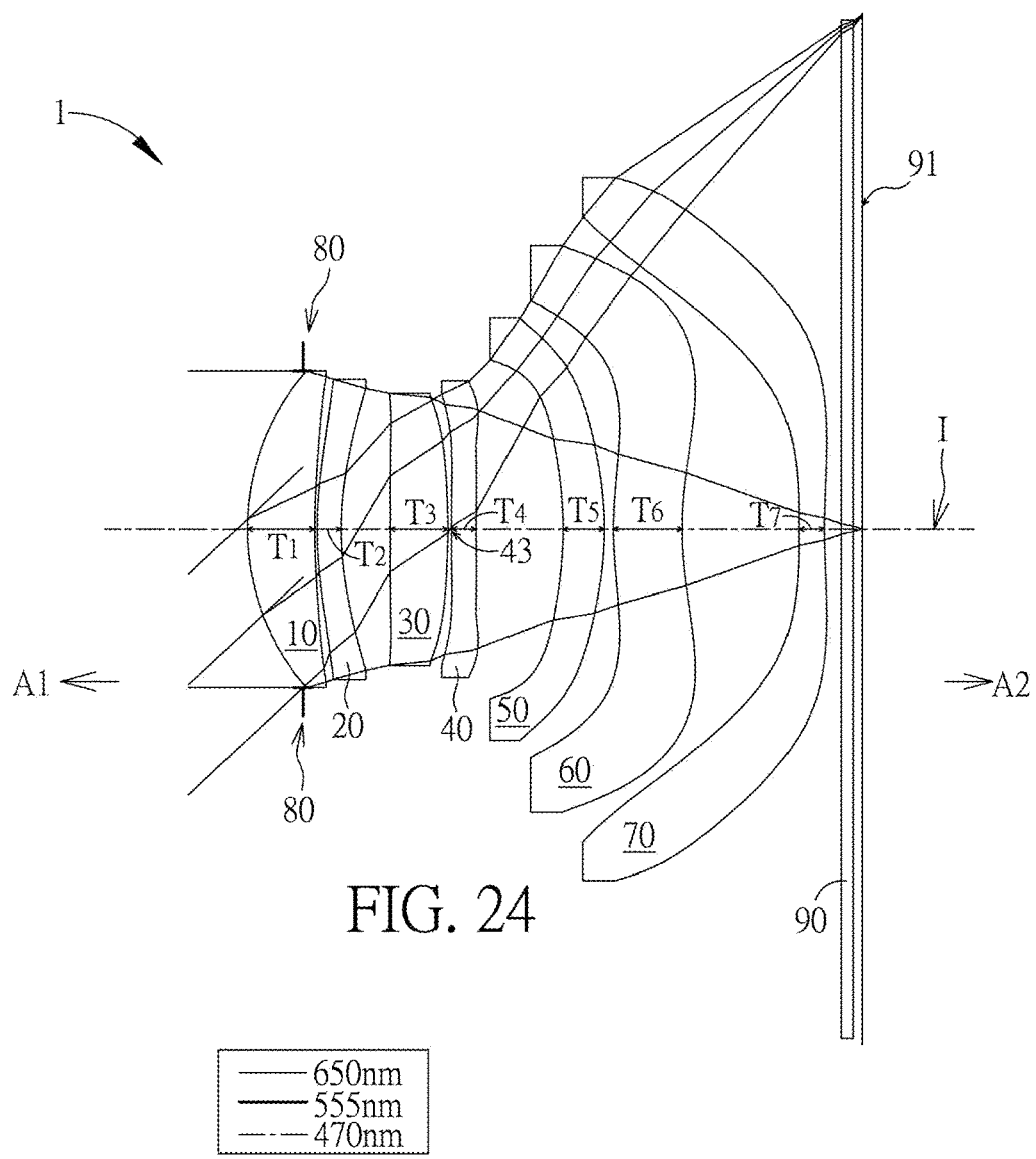
FIG. 24 illustrates a tenth example of the optical imaging lens of the present invention.
Figures 25A, 25B, 25C, 25D:
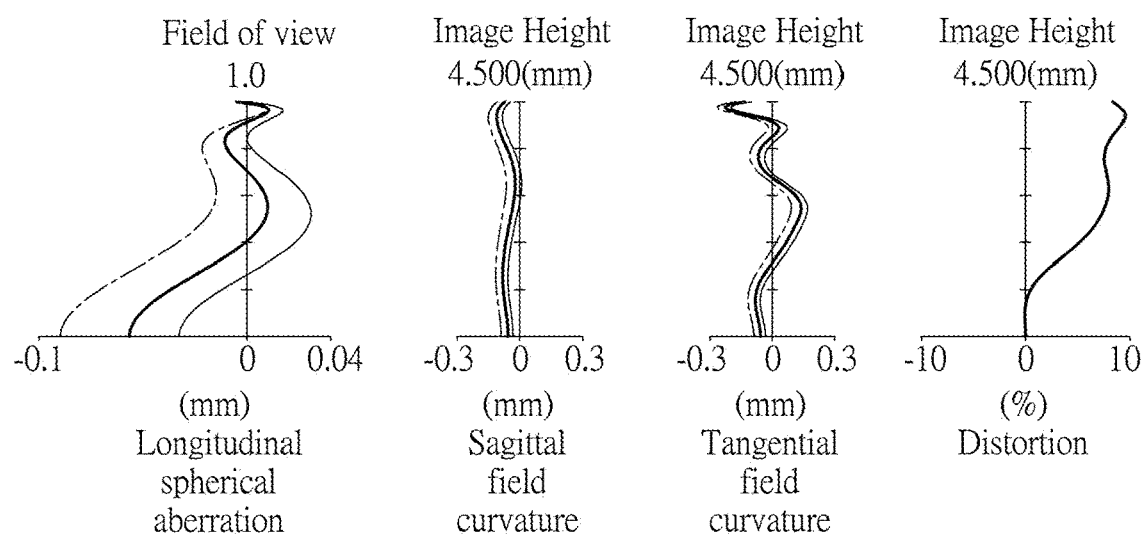
FIG. 25A illustrates the longitudinal spherical aberration on the image plane of the tenth example.
FIG. 25B illustrates the field curvature aberration on the sagittal direction of the tenth example.
FIG. 25C illustrates the field curvature aberration on the tangential direction of the tenth example.
FIG. 25D illustrates the distortion of the tenth example.

Please refer to FIG. 24 which illustrates the tenth example of the optical imaging lens 1 of the present invention. Please refer to FIG. 25A for the longitudinal spherical aberration on the image plane 91 of the tenth example; please refer to FIG. 25B for the field curvature aberration on the sagittal direction; please refer to FIG. 25C for the field curvature aberration on the tangential direction, and please refer to FIG. 25D for the distortion aberration. The components in this example are similar to those in the first example, but the optical data such as the curvature radius, the lens thickness, the aspheric surface or the back focal length in this example are different from the optical data in the first example. Besides, in this example, the sixth lens element 60 has negative refracting power, an optical axis region 43 of the object-side surface 41 of the fourth lens element 40 is concave.

The optical data of the tenth example of the optical imaging lens are shown in FIG. 46 while the aspheric surface data are shown in FIG. 47. In this example, EFL=4.303 mm; HFOV=43.256 degrees; TTL=5.385 mm; Fno=1.550; ImgH=4.500 mm. In particular: (1) The field curvature aberration on the tangential direction in this example is smaller than the field curvature aberration on the tangential direction in the first example; (2) The distortion aberration in this example is smaller than the distortion aberration in the first example; (3) The system length of the optical imaging lens TTL in this example is shorter than the system length of the optical imaging lens TTL in the first example; (4) The HFOV in this example is larger than the HFOV in the first example.

Eleventh Example

Figure 26:
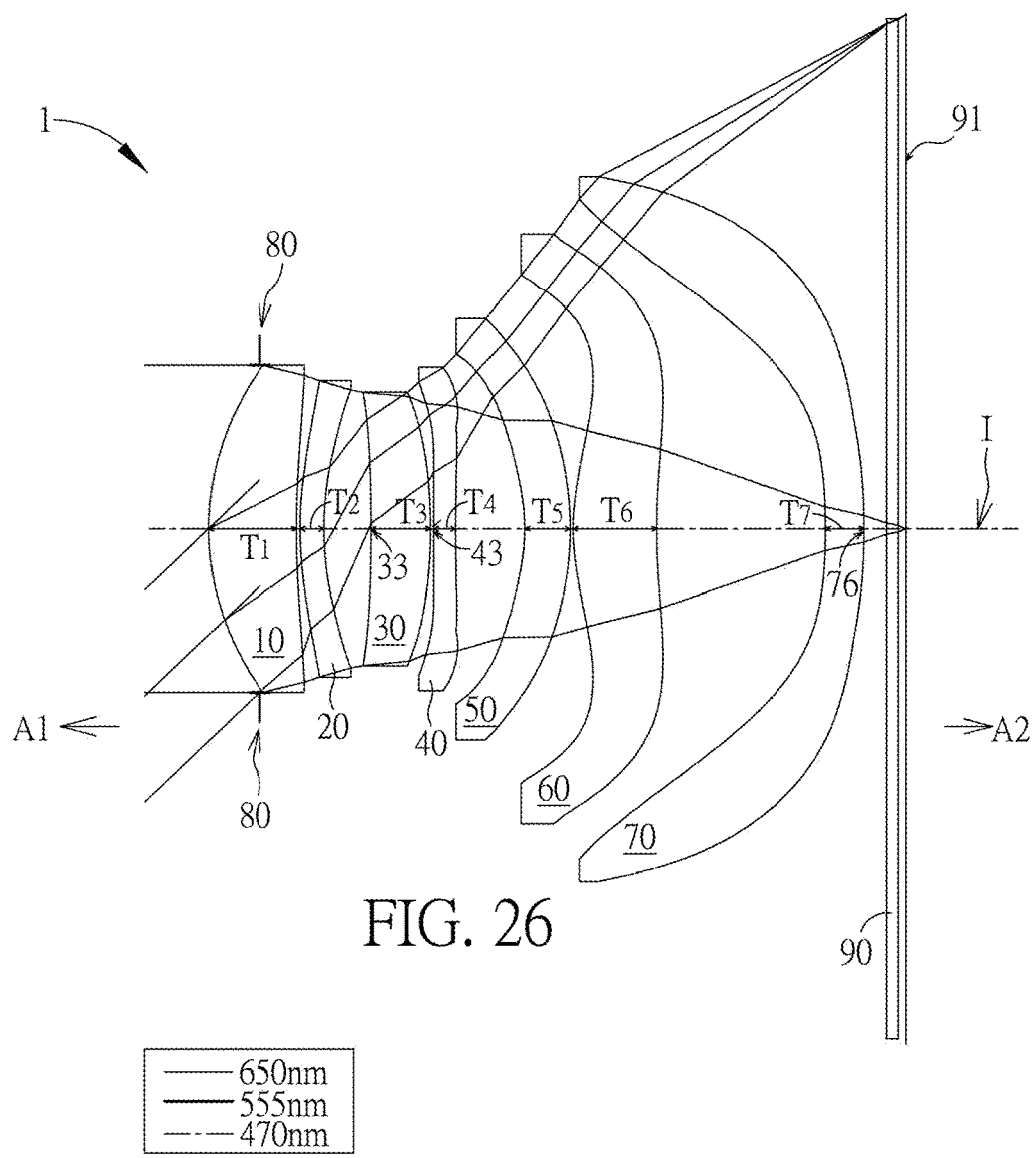
FIG. 26 illustrates an eleventh example of the optical imaging lens of the present invention.
Figures 27A, 27B, 27C, 27D:
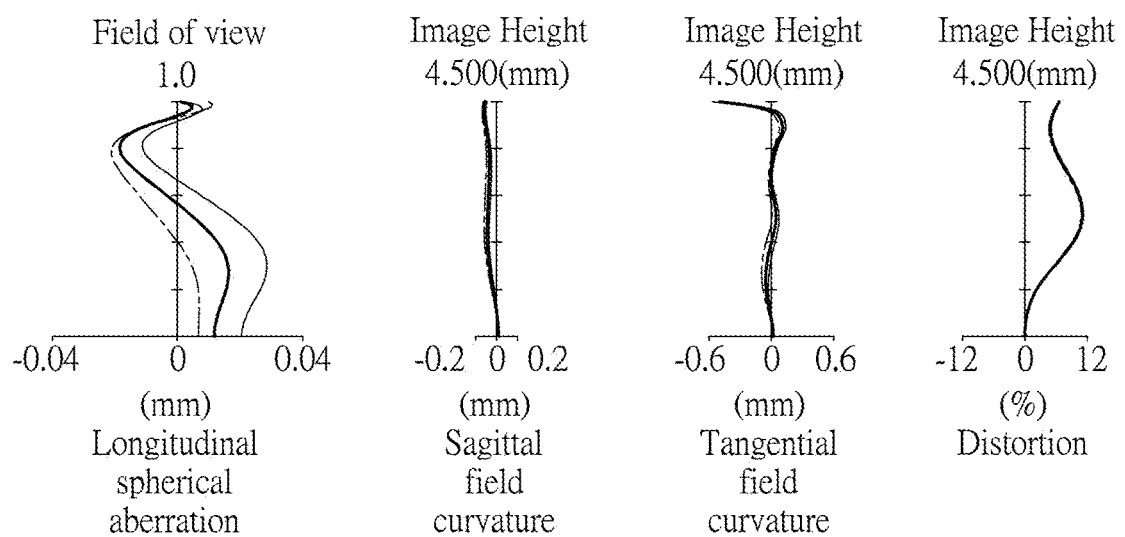
FIG. 27A illustrates the longitudinal spherical aberration on the image plane of the eleventh example.
FIG. 27B illustrates the field curvature aberration on the sagittal direction of the eleventh example.
FIG. 27C illustrates the field curvature aberration on the tangential direction of the eleventh example.
FIG. 27D illustrates the distortion of the eleventh example.

Please refer to FIG. 26 which illustrates the eleventh example of the optical imaging lens 1 of the present invention. Please refer to FIG. 27A for the longitudinal spherical aberration on the image plane 91 of the eleventh example; please refer to FIG. 27B for the field curvature aberration on the sagittal direction; please refer to FIG. 27C for the field curvature aberration on the tangential direction, and please refer to FIG. 27D for the distortion aberration. The components in this example are similar to those in the first example, but the optical data such as the curvature radius, the lens thickness, the aspheric surface or the back focal length in this example are different from the optical data in the first example. Besides, in this example, the seventh lens element 70 has positive refracting power, an optical axis region 33 of the object-side surface 31 of the third lens element 30 is concave, an optical axis region 43 of the object-side surface 41 of the fourth lens element 40 is concave, an optical axis region 76 of the image-side surface 72 of the seventh lens element 70 is convex.

The optical data of the eleventh example of the optical imaging lens are shown in FIG. 48 while the aspheric surface data are shown in FIG. 49. In this example, EFL=4.424 mm; HFOV=43.783 degrees; TTL=6.094 mm; Fno=1.550; ImgH=4.500 mm. In particular: (1) The longitudinal spherical aberration in this example is smaller than the longitudinal spherical aberration in the first example; (2) The HFOV in this example is larger than the HFOV in the first example.

Some important ratios in each example are shown in FIG. 50 and FIG. 51.

Each embodiment of the present invention provides an optical imaging lens which has good imaging quality. For example, the following lens curvature configuration may effectively reduce the field curvature aberration and the distortion aberration to optimize the imaging quality of the optical imaging lens. Furthermore, the present invention has the corresponding advantages:

1. According to each example of the invention, by designing each surface shape, for example: the periphery region 34 of the object-side surface 31 of the third lens element 30 is concave, the periphery region 44 of the object-side surface 41 of the fourth lens element 40 is concave, the fifth lens element 50 has negative refracting power, the periphery region 54 of the object-side surface 51 of the fifth lens element 50 is concave, the optical axis region 66 of the image-side surface 62 of the sixth lens element 60 is concave, when the surface shapes mentioned above matching one of the two conditions: the optical axis region 13 of the object-side surface 11 of the first lens element 10 is convex, or the periphery region 17 of the image-side surface 12 of the first lens element 10 is concave, and the periphery region 27 of the image-side surface 22 of the second lens element 20 is concave. If the conditions mentioned above are satisfied, the luminous flux of the whole optical imaging lens system can be effectively increased, and the optical imaging lens has good imaging quality.

2. Furthermore, if the condition of: (G45+T5+G56+T6+G67+T7)/(T1+G12+T2)≥3.200 is satisfied, the system length of the optical imaging lens 1 can be effectively decreased, and the preferable range is 3.200≤(G45+T5+G56+T6+G67+T7)/(T1+G12+T2)≤4.100.

3. In order to reduce the system length of the optical imaging lens 1 along the optical axis I and simultaneously to ensure the imaging quality, the air gaps between the adjacent lens elements or the thickness of each lens element should be appropriately adjusted. However, the assembly or the manufacturing difficulty should be taken into consideration as well. If the following numerical conditions are selectively satisfied, the optical imaging lens 1 of the present invention may have better optical arrangements:

$TTL/AAG \leq 3.200$, and the preferable range is
$2.000 \leq TTL/AAG \leq 3.200$;  (1)

$(EFL+BFL)/AAG \leq 3.000$, and the preferable range is
$1.800 \leq (EFL+BFL)/AAG \leq 3.000$;  (2)

$TL/(T2+T4+T7) \geq 4.200$, and the preferable range is
$4.200 \leq TL/(T2+T4+T7) \leq 10.700$;  (3)

$ALT/(T2+G23+T3) \leq 3.200$, and the preferable range is $2.100 \leq ALT/(T2+G23+T3) \leq 3.200$;  (4)

$(ALT+BFL)/(T3+G34+T4) \geq 4.000$, and the preferable range is $4.000 \leq (ALT+BFL)/(T3+G34+T4) \leq 5.900$;  (5)

$(EFL+AAG)/(G45+G56+G67) \leq 5.100$, and the preferable range is $3.300 \leq (EFL+AAG)/(G45+G56+G67) \leq 5.100$;  (6)

$TTL/(G12+G23+G45) \leq 7.000$, and the preferable range is $4.200 \leq TTL/(G12+G23+G45) \leq 7.000$;  (7)

$(T4+T5+T6)/(T2+T3) \leq 3.000$, and the preferable range is $1.000 \leq (T4+T5+T6)/(T2+T3) \leq 3.000$;  (8)

$(T3+G34+T4)/T1 \leq 2.500$, and the preferable range is $0.600 \leq (T3+G34+T4)/T1 \leq 2.500$;  (9)

$(G23+G67)/(T2+T6) \geq 1.000$, and the preferable range is $1.000 \leq (G23+G67)/(T2+T6) \leq 3.200$;  (10)

$(T6+T7)/(T3+T4) \geq 1.000$, and the preferable range is $1.000 \leq (T6+T7)/(T3+T4) \leq 2.400$;  (11)

$TL/(G12+G23+G34) \geq 8.800$, and the preferable range is $8.800 \leq TL/(G12+G23+G34) \leq 13.600$;  (12)

$TL/(G45+T5+G56) \leq 6.000$, and the preferable range is $4.000 \leq TL/(G45+T5+G56) \leq 6.000$;  (13)

$(EFL+AAG)/(ALT+BFL) \geq 1.700$, and the preferable range is $1.700 \leq (EFL+AAG)/(ALT+BFL) \leq 2.500$;  (14)

$(G23+T3+G34)/(T4+T5) \geq 1.100$, and the preferable range is $1.100 \leq (G23+T3+G34)/(T4+T5) \leq 2.000$;  (15)

$(G45+G56+G67)/(G12+G23+G34) \geq 2.580$, and the preferable range is $2.580 \leq (G45+G56+G67)/(G12+G23+G34) \leq 4.800$;  (16)

$(T1+T2+G23)/(T5+G56) \geq 1.700$, and the preferable range is $1.700 \leq (T1+T2+G23)/(T5+G56) \leq 4.900$; and  (17)

$TTL/(G23+G45) \leq 6.100$, and the preferable range is $4.300 \leq TTL/(G23+G45) \leq 6.100$.  (18)

By observing three representative wavelengths of 470 nm, 555 nm and 650 nm in each embodiment of the present invention, it is suggested off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths of 470 nm, 555 nm and 650 nm are pretty close to one another, which means the embodiments of the present invention are able to concentrate light of the three representing different wavelengths so that the aberration is greatly improved. Given the above, it is understood that the embodiments of the present invention provides outstanding imaging quality.

The numeral value ranges within the maximum and minimum values obtained from the combination ratio relationships of the optical parameters disclosed in each embodiment of the invention can all be implemented accordingly.

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a shorter system length of the optical imaging lens, a larger aperture available, better imaging quality or a better fabrication yield to overcome the drawbacks of prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element, a sixth lens element and a seventh lens element, wherein the first lens element to the seventh lens element each has an object-side surface facing toward the object side to allow imaging rays to pass through as well as an image-side surface facing toward the image side to allow the imaging rays to pass through, wherein:
   a periphery region of the image-side surface of the first lens element is concave;
   a periphery region of the object-side surface of the third lens element is concave;
   a periphery region of the object-side surface of the fourth lens element is concave;
   the fifth lens element has negative refracting power, and a periphery region of the object-side surface of the fifth lens element is concave;
   an optical axis region of the image-side surface of the sixth lens element is concave;
   the lens elements having refracting power included by the optical imaging lens are only the seven lens elements described above,
   wherein the optical imaging lens satisfies the relationships:
   $(G45+T5+G56+T6+G67+T7)/(T1+G12+T2) \geq 3.200$, T1 is a thickness of the first lens element along the optical axis, T2 is a thickness of the second lens element along the optical axis, T5 is a thickness of the fifth lens element along the optical axis, T6 is a thickness of the sixth lens element along the optical axis, T7 is a thickness of the seventh lens element along the optical axis, G12 is an air gap between the first lens element and the second lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis.

2. The optical imaging lens of claim 1, wherein TTL is the distance from the object-side surface of the first lens element to an image plane along the optical axis, AAG is a sum of six air gaps from the first lens element to the seventh lens element along the optical axis, and the optical imaging lens satisfies the relationship: $TTL/AAG \leq 3.200$.

3. The optical imaging lens of claim 1, wherein EFL is an effective focal length of the optical imaging lens, BFL is a distance from the image-side surface of the seventh lens element to an image plane along the optical axis, AAG is a sum of six air gaps from the first lens element to the seventh lens element along the optical axis, and the optical imaging lens satisfies the relationship: $(EFL+BFL)/AAG \leq 3.000$.

4. The optical imaging lens of claim 1, wherein TL is a distance from the object-side surface of the first lens element to the image-side surface of the seventh lens element along the optical axis, T4 is a thickness of the fourth lens element along the optical axis, and the optical imaging lens satisfies the relationship: $TL/(T2+T4+T7) \geq 4.200$.

5. The optical imaging lens of claim 1, wherein ALT is a sum of thicknesses of seven lens elements along the optical axis, T3 is a thickness of the third lens element along the optical axis, G23 is an air gap between the second lens element and the third lens element along the optical axis, and the optical imaging lens satisfies the relationship: $ALT/(T2+G23+T3) \leq 3.200$.

6. The optical imaging lens of claim 1, wherein ALT is a sum of thicknesses of seven lens elements along the optical axis, BFL is a distance from the image-side surface of the seventh lens element to an image plane along the optical axis, T3 is a thickness of the third lens element along the optical axis, T4 is a thickness of the fourth lens element along the optical axis, G34 is an air gap between the third lens element and the fourth lens element along the optical axis, and the optical imaging lens satisfies the relationship: $(ALT+BFL)/(T3+G34+T4) \geq 4.000$.

7. The optical imaging lens of claim 1, wherein EFL is an effective focal length of the optical imaging lens, AAG is a sum of six air gaps from the first lens element to the seventh lens element along the optical axis, and the optical imaging lens satisfies the relationship: $(EFL+AAG)/(G45+G56+G67) \leq 5.100$.

8. The optical imaging lens of claim 1, wherein TTL is the distance from the object-side surface of the first lens element to an image plane along the optical axis, G23 is an air gap between the second lens element and the third lens element along the optical axis, and the optical imaging lens satisfies the relationship: $TTL/(G12+G23+G45) \leq 7.000$.

9. The optical imaging lens of claim 1, wherein T3 is a thickness of the third lens element along the optical axis, T4 is a thickness of the fourth lens element along the optical axis, and the optical imaging lens satisfies the relationship: $(T4+T5+T6)/(T2+T3) \leq 3.000$.

10. The optical imaging lens of claim 1, wherein T3 is a thickness of the third lens element along the optical axis, T4 is a thickness of the fourth lens element along the optical axis, G34 is an air gap between the third lens element and the fourth lens element along the optical axis, and the optical imaging lens satisfies the relationship: $(T3+G34+T4)/T1 \leq 2.500$.

11. An optical imaging lens, from an object side to an image side in order along an optical axis comprising: a first lens element, a second lens element, a third lens element, a fourth lens element, a fifth lens element, a sixth lens element and a seventh lens element, wherein the first lens element to the seventh lens element each has an object-side surface facing toward the object side to allow imaging rays to pass through as well as an image-side surface facing toward the image side to allow the imaging rays to pass through, wherein:
- an optical axis region of the object-side surface of the first lens element is convex;
- a periphery region of the image-side surface of the second lens element is concave;
- a periphery region of the object-side surface of the third lens element is concave;
- a periphery region of the object-side surface of the fourth lens element is concave;
- the fifth lens element has negative refracting power, and a periphery region of the object-side surface of the fifth lens element is concave;
- an optical axis region of the image-side surface of the sixth lens element is concave;
- the lens elements having refracting power included by the optical imaging lens are only the seven lens elements described above,
- wherein the optical imaging lens satisfies the relationships:

$(G45+T5+G56+T6+G67+T7)/(T1+G12+T2) \geq 3.200$, T1 is a thickness of the first lens element along the optical axis, T2 is a thickness of the second lens element along the optical axis, T5 is a thickness of the fifth lens element along the optical axis, T6 is a thickness of the sixth lens element along the optical axis, T7 is a thickness of the seventh lens element along the optical axis, G12 is an air gap between the first lens element and the second lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis.

12. The optical imaging lens of claim 11, wherein G23 is an air gap between the second lens element and the third lens element along the optical axis, and the optical imaging lens satisfies the relationship: $(G23+G67)/(T2+T6) \geq 1.000$.

13. The optical imaging lens of claim 11, wherein T3 is a thickness of the third lens element along the optical axis, T4 is a thickness of the fourth lens element along the optical axis, and the optical imaging lens satisfies the relationship: $(T6+T7)/(T3+T4) \geq 1.000$.

14. The optical imaging lens of claim 11, wherein TL is a distance from the object-side surface of the first lens element to the image-side surface of the seventh lens element along the optical axis, G23 is an air gap between the second lens element and the third lens element along the optical axis, G34 is an air gap between the third lens element and the fourth lens element along the optical axis, and the optical imaging lens satisfies the relationship: $TL/(G12+G23+G34) \geq 8.800$.

15. The optical imaging lens of claim 11, wherein TL is a distance from the object-side surface of the first lens element to the image-side surface of the seventh lens element along the optical axis, and the optical imaging lens satisfies the relationship: $TL/(G45+T5+G56) \leq 6.000$.

16. The optical imaging lens of claim 11, wherein EFL is an effective focal length of the optical imaging lens, AAG is a sum of six air gaps from the first lens element to the seventh lens element along the optical axis, ALT is a sum of thicknesses of seven lens elements along the optical axis, BFL is a distance from the image-side surface of the seventh lens element to an image plane along the optical axis, and the optical imaging lens satisfies the relationship: $(EFL+AAG)/(ALT+BFL) \geq 1.700$.

17. The optical imaging lens of claim 11, wherein T3 is a thickness of the third lens element along the optical axis, T4 is a thickness of the fourth lens element along the optical axis, G23 is an air gap between the second lens element and the third lens element along the optical axis, G34 is an air gap between the third lens element and the fourth lens element along the optical axis, and the optical imaging lens satisfies the relationship: $(G23+T3+G34)/(T4+T5) \geq 1.100$.

18. The optical imaging lens of claim 11, wherein G23 is an air gap between the second lens element and the third lens element along the optical axis, G34 is an air gap between the third lens element and the fourth lens element along the optical axis, and the optical imaging lens satisfies the relationship: $(G45+G56+G67)/(G12+G23+G34) \geq 2.580$.

19. The optical imaging lens of claim 11, wherein G23 is an air gap between the second lens element and the third lens element along the optical axis, and the optical imaging lens satisfies the relationship: $(T1+T2+G23)/(T5+G56) \geq 1.700$.

20. The optical imaging lens of claim 11, wherein TTL is the distance from the object-side surface of the first lens element to an image plane along the optical axis, G23 is an air gap between the second lens element and the third lens element along the optical axis, and the optical imaging lens satisfies the relationship: $TTL/(G23+G45) \leq 6.100$.

* * * * *